US011874030B2

(12) United States Patent
Delgado-Nanez et al.

(10) Patent No.: US 11,874,030 B2
(45) Date of Patent: Jan. 16, 2024

(54) ARTICULATION JOINTS FOR TERRAIN FOLLOWING SOLAR TRACKER

(71) Applicant: Nextracker LLC, Fremont, CA (US)

(72) Inventors: Ricardo Delgado-Nanez, San Jose, CA (US); Kin Tsim, San Mateo, CA (US)

(73) Assignee: NEXTRACKER LLC, Fremont, CA (US)

( * ) Notice: Subject to any disclaimer, the term of this patent is extended or adjusted under 35 U.S.C. 154(b) by 0 days.

(21) Appl. No.: 18/080,314

(22) Filed: Dec. 13, 2022

(65) Prior Publication Data

US 2023/0129712 A1  Apr. 27, 2023

Related U.S. Application Data

(63) Continuation of application No. 17/525,157, filed on Nov. 12, 2021, now Pat. No. 11,525,604.

(60) Provisional application No. 63/270,296, filed on Oct. 21, 2021.

(51) Int. Cl.
*F24S 30/45* (2018.01)
*F24S 30/455* (2018.01)
*F24S 30/458* (2018.01)
*F24S 30/00* (2018.01)

(52) U.S. Cl.
CPC ........... *F24S 30/455* (2018.05); *F24S 30/458* (2018.05); *F24S 2030/16* (2018.05); *F24S 2030/19* (2018.05)

(58) Field of Classification Search
CPC .... F24S 30/455; F24S 30/458; F24S 2030/16; F24S 2030/19
See application file for complete search history.

(56) References Cited

U.S. PATENT DOCUMENTS

| | | |
|---|---|---|
| 8,536,441 B2 | 9/2013 | Giacalone et al. |
| 8,806,834 B2 | 8/2014 | Werner et al. |
| 8,807,839 B2 | 8/2014 | Jang |
| 8,939,648 B2 | 1/2015 | Schneider et al. |
| 9,035,168 B2 | 5/2015 | Barton |
| 9,157,658 B2 | 10/2015 | Kunz |
| 9,182,153 B2 | 11/2015 | Moore |
| 9,206,999 B2 | 12/2015 | Reed et al. |

(Continued)

FOREIGN PATENT DOCUMENTS

| | | |
|---|---|---|
| AU | 2015360309 A1 | 7/2017 |
| AU | 2017346481 A1 | 5/2019 |

(Continued)

OTHER PUBLICATIONS

PCT Search Report and Written Opinion issued in PCT Application No. PCT/US2022/047274 dated Dec. 22, 2022.

*Primary Examiner* — Alfred Basichas
(74) *Attorney, Agent, or Firm* — Fredrikson & Byron, P.A.

(57) ABSTRACT

A coupling system for use with a solar tracker includes a support flange, a swivel flange rotatably supported on the support flange, an articulation joint interposed between each of the support flange and the swivel flange and rotatably supported by each of the support flange and the swivel flange, wherein opposed first and second end portions of the articulation joint are configured to be operably coupled to a respective first and second torque tube, and at least one locking fastener selectively coupled to a portion of the support flange and a portion of the swivel flange, the at least one locking fastener configured to selectively inhibit rotation of the swivel flange relative to the support flange.

20 Claims, 16 Drawing Sheets

(56) References Cited

U.S. PATENT DOCUMENTS

| | | |
|---|---|---|
| 9,239,172 B2 | 1/2016 | Domingo et al. |
| 9,273,721 B2 | 3/2016 | Behn et al. |
| 9,303,684 B2 | 4/2016 | Lumbreras |
| 9,322,437 B2 | 4/2016 | Agullo |
| 9,453,899 B2 | 9/2016 | Paponneau |
| 9,482,449 B2 | 11/2016 | Cole et al. |
| 9,806,669 B2 | 10/2017 | Welle |
| 9,819,301 B2 | 11/2017 | Agullo |
| 9,845,824 B2 | 12/2017 | Lamb et al. |
| 10,082,173 B2 | 9/2018 | Jones et al. |
| 10,097,134 B2 | 10/2018 | Molina et al. |
| 10,320,326 B2 | 6/2019 | Schimelpfenig et al. |
| 10,326,401 B2 | 6/2019 | Wu |
| 10,415,853 B2 | 9/2019 | Habdank |
| 10,541,643 B2 | 1/2020 | Knox |
| 10,584,902 B2 | 3/2020 | Ruiz et al. |
| 10,605,489 B2 | 3/2020 | Worden |
| 10,866,011 B2 | 12/2020 | Mertins |
| 10,944,354 B2 | 3/2021 | Ballentine et al. |
| 11,035,591 B2 | 6/2021 | Childress |
| 11,251,745 B2 | 2/2022 | Taha et al. |
| 2009/0314280 A1 | 12/2009 | Banerjee |
| 2011/0100355 A1 | 5/2011 | Pedretti |
| 2011/0186041 A1 | 8/2011 | Kalina |
| 2014/0054433 A1 | 2/2014 | Reisch et al. |
| 2015/0107580 A1 | 4/2015 | Weber et al. |
| 2017/0366133 A1 | 12/2017 | Taha et al. |
| 2018/0091088 A1 | 3/2018 | Barton et al. |
| 2019/0190445 A1 | 6/2019 | Alderman et al. |
| 2019/0199277 A1 | 6/2019 | Tordo et al. |
| 2020/0052644 A1 | 2/2020 | Taha et al. |

FOREIGN PATENT DOCUMENTS

| | | |
|---|---|---|
| AU | 2015360309 B2 | 6/2021 |
| AU | 2021232779 A1 | 10/2021 |
| EP | 3231084 A1 | 10/2017 |
| EP | 3231084 A4 | 8/2018 |
| JP | 2018500875 A | 1/2018 |
| JP | 6957356 B2 | 11/2021 |
| JP | 2022003866 A | 1/2022 |
| MX | 2017007690 A | 11/2017 |
| MX | 2019004417 A | 8/2019 |
| WO | 2016094864 A1 | 6/2016 |
| WO | 2018075368 A1 | 4/2018 |
| WO | 2018167643 A1 | 9/2018 |
| WO | 2019086731 A1 | 5/2019 |
| ZA | 201704576 B | 9/2019 |

ARTICULATION JOINTS FOR TERRAIN FOLLOWING SOLAR TRACKER

CROSS-REFERENCE TO RELATED APPLICATION

The present disclosure is a Continuation of U.S. patent application Ser. No. 17/525,157, filed on Nov. 12, 2021, which claims the benefit of, and priority to, U.S. Provisional Patent Application Ser. No. 63/270,296, filed on Oct. 21, 2021, the entire content of each of which is hereby incorporated by reference herein.

BACKGROUND

Technical Field

The present disclosure relates to solar power generation systems, and more particularly, to couplings and articulation joints permitting poly-axial rotation of adjacent solar arrays installed on uneven terrain.

Background of Related Art

One of the most significant, costly, and time-consuming aspects relating to the manufacture and installation of solar trackers is the requirement that the site be substantially level. While certainly some sites are generally level, most terrain has some undulation, and in some instances, quite a significant pitch to the terrain. In practical terms, this requires installers of solar trackers to conduct a significant amount of earth excavation and moving. Such earthworks are time consuming, require significant amounts of heavy machinery, and are subject to a significant amount of regulation. Indeed, some projects have been halted owing to the environmental impact of the earthmoving required to produce a relatively level site for the installation of the solar trackers.

An alternative to massive earth works is the use of custom pier heights. A solar tracker is typically comprised of a torque tube that supports the solar panels and is itself supported by piers embedded into the ground. A second method of addressing changing terrain is the use of piers which are formed specifically for the location in which they will be embedded in the ground. In this way, the level of the torque tube can remain consistent without requiring the moving or removing of earth. However, while the earthmoving costs are reduced, there are additional financial and timing costs associated with custom piers. First, these are custom length piers which require custom length determinations. Next, the custom piers need to be accurately identified and sorted with respect to the site so than can be installed in their custom location. All of this requires significant resource and ultimately increases the cost of installation.

To alleviate the logistical and financial burden associated with the use of custom length piers, an alternative is to utilize identical pier lengths and permit the solar trackers to follow the natural undulations of the terrain. As can be appreciated, the torque tubes extending between each pier must be permitted to rotate and effectuate rotation of an adjacent torque tube, which due to the topography of the terrain, may or may not be placed in coaxial alignment therewith.

SUMMARY

In accordance with an aspect of the present disclosure, a coupling system for use with a solar tracker includes a support flange, a swivel flange rotatably supported on the support flange, an articulation joint interposed between each of the support flange and the swivel flange and rotatably supported by each of the support flange and the swivel flange, wherein opposed first and second end portions of the articulation joint are configured to be operably coupled to a respective first and second torque tube, and at least one locking fastener selectively coupled to a portion of the support flange and a portion of the swivel flange, the at least one locking fastener configured to selectively inhibit rotation of the swivel flange relative to the support flange.

In aspects, the at least one locking fastener may be configured to permit rotation of the swivel flange relative to the support flange when placed in a first, unlocked position and inhibit rotation of the swivel flange relative to the support flange when placed in a second, locked position.

In certain aspects, the at least one locking fastener may be operably coupled to a slot having an arcuate profile.

In other aspects, the articulation joint may be a constant velocity joint.

In aspects, the articulation joint may be a universal joint.

In other aspects, the swivel flange may be rotatably supported on the support flange about a first axis and the articulation joint is rotatably supported by the swivel flange and the support flange about a second axis that is generally transverse to the first axis.

In certain aspects, the articulation joint may be rotatably supported by at least one bearing operably coupled to a portion of each of the support flange and the swivel flange.

In aspects, the coupling system may include a pair of cradles operably coupled to a respective end portion of the articulation joint, the pair of cradles configured to receive a respective torque tube therein.

In other aspects, the swivel flange may be rotatably supported on the support flange at a location that is offset from a center portion of the support flange.

In accordance with another aspect of the present disclosure, a coupling system for use with a solar tracker includes an articulation joint including a constant velocity joint and a stub axle operably coupled to a portion of the constant velocity joint, and a pair of cradles, each cradle of the pair of cradles operably coupled to a portion of a respective one of the constant velocity joint and the stub axle of the articulation joint, wherein each of the pair of cradles is configured to receive a portion of a respective torque tube therein.

In aspects, the coupling system may include a support flange rotatably supporting the constant velocity joint and a swivel flange rotatably supporting the stub axle.

In certain aspects, the swivel flange may be rotatably supported on the support flange such that the swivel flange is selectively permitted to rotate relative to the support flange about a first axis.

In other aspects, the articulation joint may be rotatably supported by the support flange and the swivel flange about a second axis that is generally transverse to the first axis.

In certain aspects, the coupling system may include at least one locking fastener selectively coupled to a portion of each of the support flange and the swivel flange, the at least one locking fastener configured to selectively inhibit rotation of the swivel flange relative to the support flange.

In accordance with yet another aspect of the present disclosure, a solar tracker includes at least one pier, a pair of torque tubes, wherein the at least one pier is interposed between the pair of torque tubes, and a coupling system including a support flange, a swivel flange rotatably supported on the support flange, an articulation joint interposed between each of the support flange and the swivel flange and rotatably supported by each of the support flange and the swivel flange, wherein opposed first and second end portions of the articulation joint are configured to be operably coupled to a respective first and second torque tube, and at least one locking fastener selectively coupled to a portion of the support flange and a portion of the swivel flange, the at least one locking fastener configured to selectively inhibit rotation of the swivel flange relative to the support flange.

In aspects, the at least one locking fastener may be configured to permit rotation of the swivel flange relative to the support flange when placed in a first, unlocked position and inhibit rotation of the swivel flange relative to the support flange when placed in a second, locked position.

In other aspects, the at least one locking fastener may be operably coupled to a slot having an arcuate profile.

In certain aspects, the articulation joint may be a constant velocity joint.

In other aspects, the articulation joint may be a universal joint.

In aspects, the coupling system may include a pair of cradles operably coupled to a respective end portion of the articulation joint, the pair of cradles configured to receive a respective torque tube of the pair of torque tubes therein.

BRIEF DESCRIPTION OF THE DRAWINGS

Various aspects and features of the present disclosure are described hereinbelow with reference to the drawings, wherein.

DETAILED DESCRIPTION

Figure 1:
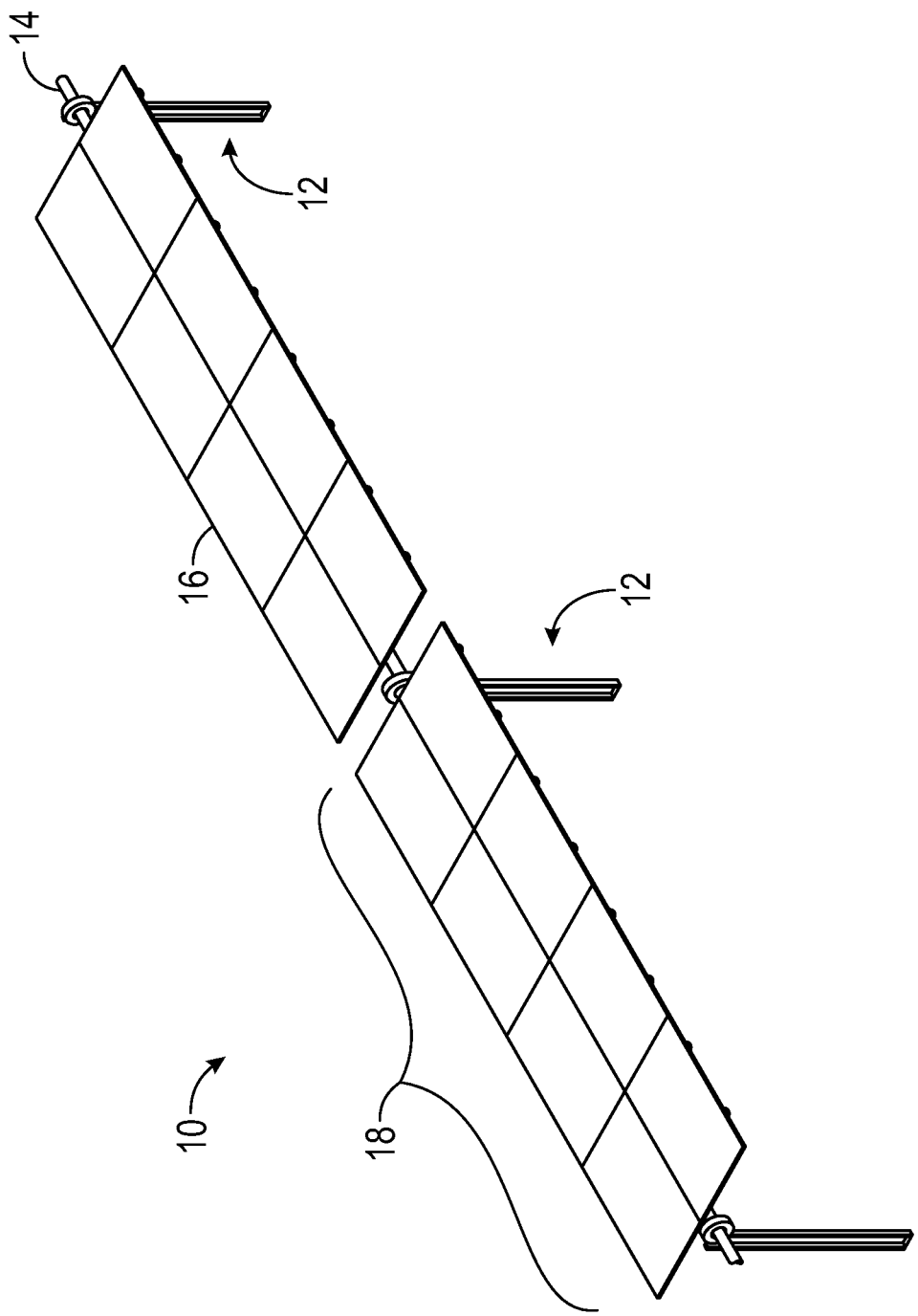
FIG. 1 is a perspective view of a solar tracking system provided in accordance with the present disclosure.

The present disclosure is directed to a coupling system for use with a solar tracker. The coupling system enables a solar tracker to be installed on undulating terrains while maintaining a generally parallel orientation of the torque tube to the ground. As such, the length of each pier of the solar tracker may be substantially the same, and the reveal of each pier above the ground may likewise be substantially similar to one another, thereby reducing the labor required to measure a custom length for each pier and/or reducing the amount of material needed for each pier (the piers no longer need to accommodate for the varying lengths required to embed the piers a required depth into the ground.

The coupling system or torque tube coupling includes a support flange, a swivel flange, an articulation joint, and a pair of cradles. The support flange is configured to be coupled to an upper portion a respective pier and includes a generally U-shaped profile. The swivel flange includes a pair of flanges arranged in juxtaposed relation to one another and rotatably supported on the support flange about a first axis. Each flange of the pair of flanges includes a slot formed through a side surface thereof that is configured to accommodate a locking fastener. In this manner, the pair of flanges may be articulated or otherwise rotated relative to one another about the first axis when the locking fastener in placed in a first, unlocked position. When the locking fastener is placed in the second, locked position, the pair of flanges is inhibited from rotating relative to one another. It is contemplated that the locking fastener may be pre-installed at the factory before installation or may be omitted from the swivel flange and installed during installation of the coupling system on the solar tracker.

The pair of flanges of the swivel flange each include a bearing, such as a bushing, ball bearing, needle bearing, amongst others, operably coupled thereto to rotatably support a portion of the articulation joint when the articulation joint is interposed between the pair of flanges. In this manner, the articulation joint is disposed within a spaced formed between the pair of flanges and is rotatably supported therein by the bearings about a second axis that is generally transverse to the first axis. The articulation joint may be a constant velocity joint or a universal joint, depending upon the design needs of the solar tracker. In embodiments, the articulation joint is a rzeppa style constant velocity joint.

In embodiments, the coupling system may include a support flange that is coupled to the pier and a swivel flange that is rotatably supported on the support flange. The support flange rotatably supports the constant velocity joint and the swivel flange rotatably supports a stub axle that is operably coupled to a portion of the constant velocity joint such that rotation of the stub axle effectuates a corresponding rotation of the constant velocity joint and vice versa. The swivel flange is rotatably supported on the support flange at a location that is generally in line with a center of rotation of the constant velocity joint. In this manner, the point of rotation of the swivel flange is offset from a center portion of the support flange, and therefore, a center portion of the pier on which the support flange is supported. Although generally described as being flanges, it is envisioned that the support flange may be a bearing housing assembly and the swivel flange may be a gimbal or the like that is rotatably supported on the bearing housing assembly.

A pair of cradles is operably coupled to a respective end portion of the articulation joint such that the articulation joint and each of the pair of cradles are caused to rotate in unison. The pair of cradles is configured to be operably coupled to a portion of a respective torque tube of the solar tracker. In this manner, when adjacent torque tubes are disposed at an angle to one another, the articulation joint may accommodate the difference in angle while permitting rotation of the torque tubes. As can be appreciated, the use of a constant velocity joint enables the adjacent torque tubes to rotate in unison, without phase differences or differences in angle relative to one another through a certain amount of rotation about the second axis.

The coupling system includes at least one pair of stow stops disposed on the pair of cradles that inhibit over rotation of the pair of cradles in a first and second direction. The pair of stow stops is disposed in spaced relation to one another adjacent the cradle such that as the cradle is rotated a first amount in a first direction, a portion of the cradle abuts a portion of a first stow stop. As the cradle is rotated a second amount in a second direction, a second portion of the cradle abuts a portion of a second stow stop. As an be appreciated, the pair of stow stops inhibits over rotation of the torque tubes, reduces stresses placed on the articulation joint, pier, torque tube, etc. when the torque tubes are subjected to wind loads or during other situations. These and other aspects of the present disclosure will be described in detail herein below with reference to the drawings.

Referring now to the drawings, a solar tracker provided in accordance with the present disclosure is illustrated in FIG. 1 and generally identified by reference numeral 10. The solar tracker 10 includes a plurality of piers 12 disposed in spaced relation to one another and embedded in the earth. A torque tube 14 extends between each adjacent pier 12 and is rotatably supported on each pier 12. The solar tracker 10 includes a plurality of solar panels 16 supported on each respective torque tube 14. The span between two adjacent piers 12 is referred to as a bay 18 and may be generally in the range of about 8 meters in length. A plurality of solar trackers 10 may be arranged in a north-south longitudinal orientation to form a solar array.

Figure 2:
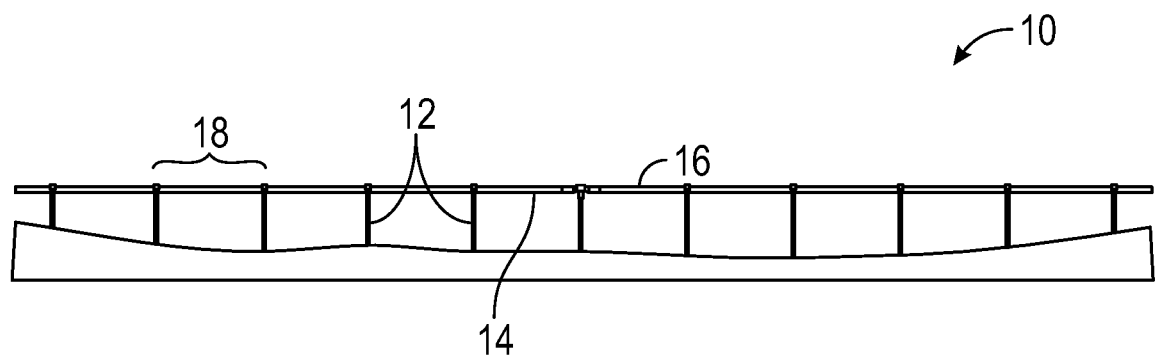
FIG. 2 is an elevation view of the solar tracking system of FIG. 1 installed on generally flat ground.

With reference to FIG. 2, a solar tracker 10 is illustrated as being installed on substantially flat terrain. As can be seen, the reveal of each of the piers 12 (e.g., the amount each pier 12 extends above the ground) is somewhat different from its neighboring piers 12. Where the difference in height of the ground is relatively small (e.g., within about 0.1 degree of elevation change from one pier 12 to the next), a common side pier 12 may be employed and simply driven into the ground to a slightly different depth to maintain the torque tube 14 substantially parallel to the ground.

Figure 3:
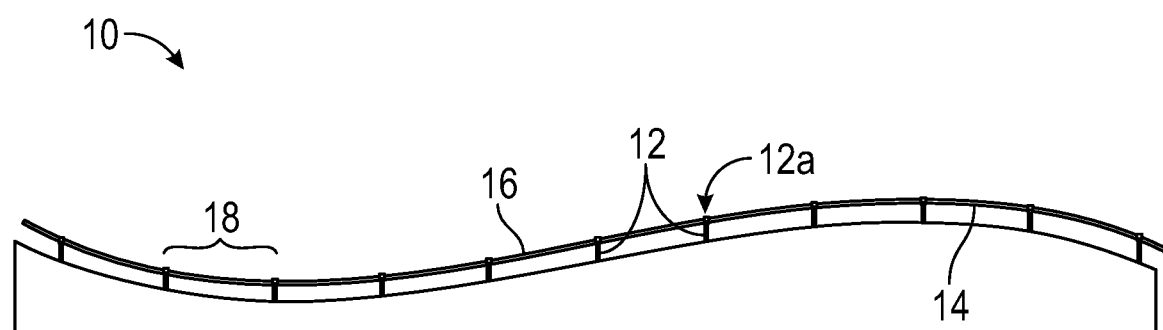
FIG. 3 is an elevation view of the solar tracking system of FIG. 1 installed on rolling terrain.

Turning to FIG. 3, in accordance with aspects of the present disclosure, the solar tracker 10 is illustrated as being installed on undulating terrain. Each pier of the plurality of piers 12 is driven into the earth such that substantially the same amount of reveal is present for each. In this manner, the distance between an upper portion 12a of each pier and the surface of the earth is substantially the same. In this manner, the overall length of each pier 12 may be substantially similar, thereby eliminating the need for determining a custom length for each pier at a particular location. Further, by maintaining a substantially similar reveal, the overall length of each pier 12 may be reduced, as the length of the pier 12 does not need to accommodate depressions in the terrain in order to ensure a proper amount of the pier 12 is driven into the ground while maintaining a substantially level height with adjacent piers 12.

As can be appreciated, with the reveal for each pier 12 being substantially similar, the torque tube 14 extending between each adjacent pier 12 must follow the differing heights of the piers 12, resulting in the torque tube 14 being substantially parallel to the contours of the terrain. In embodiments, the change in slope along the torque tube 14 can be up to about 0.75 degrees per bay 18 and a pier-to-pier height differential of about 10.5 cm. As can be appreciated, the change in slope along the torque tube 14 defines a corresponding angle with respect to each respective pier 12. In this manner, the angle of a torque tube 14 on one side of a pier 12 may be different than an angle of an adjacent torque tube 14 on the other side of the pier 12. To accommodate this difference in angles of each adjacent torque tube 14 relative to another, each pier 12 includes a torque tube coupling 20 (FIG. 4) disposed on the upper portion 12a of the pier 12 that accommodates differing angles of adjacent torque tubes 14 coupled thereto as the torque tubes 14 are rotated to adjust an angle of the solar panels 16.

Figure 4:
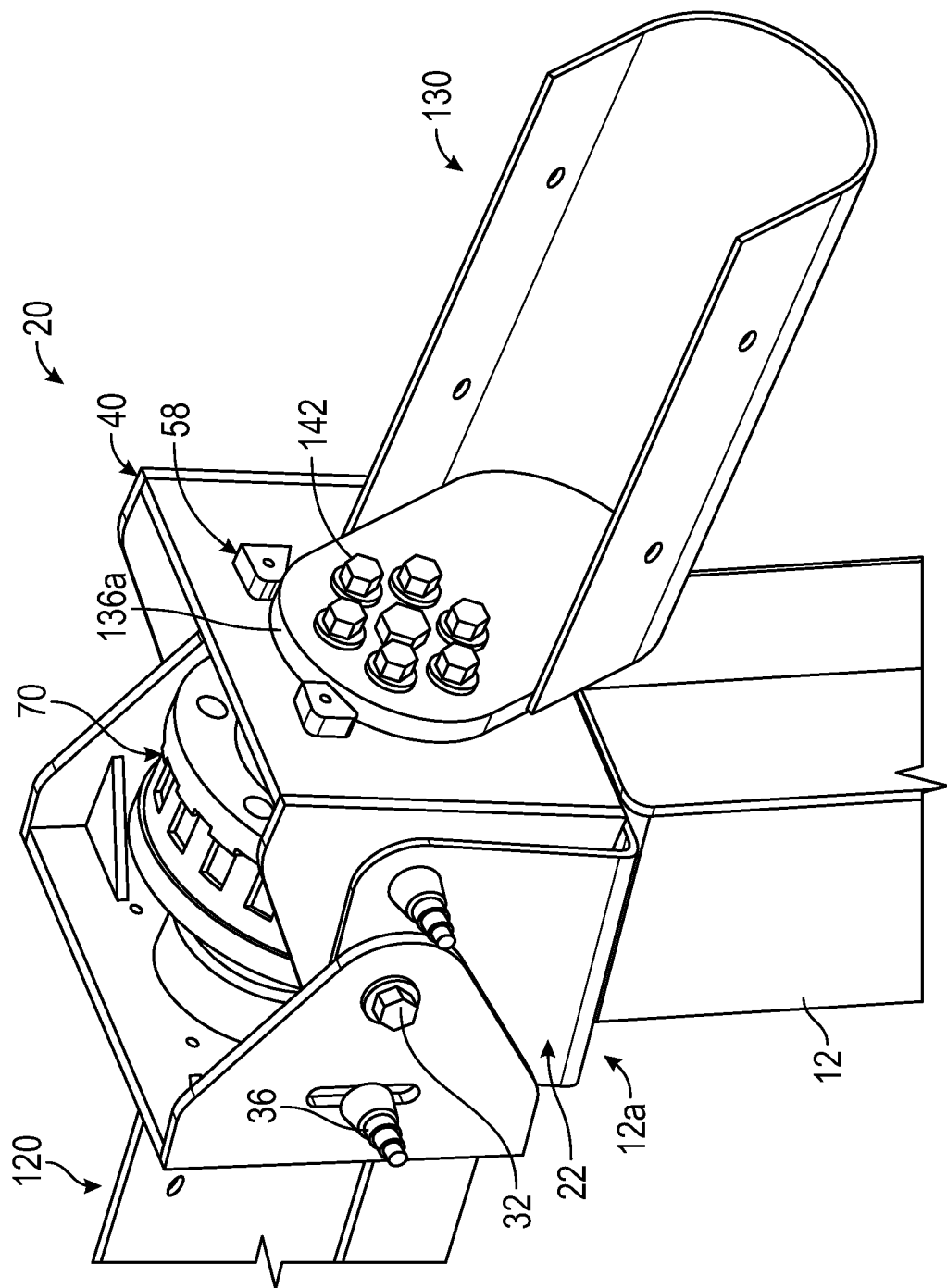
FIG. 4 is a perspective view of a torque tube coupling of the solar tracking system of FIG. 1.
Figure 5:
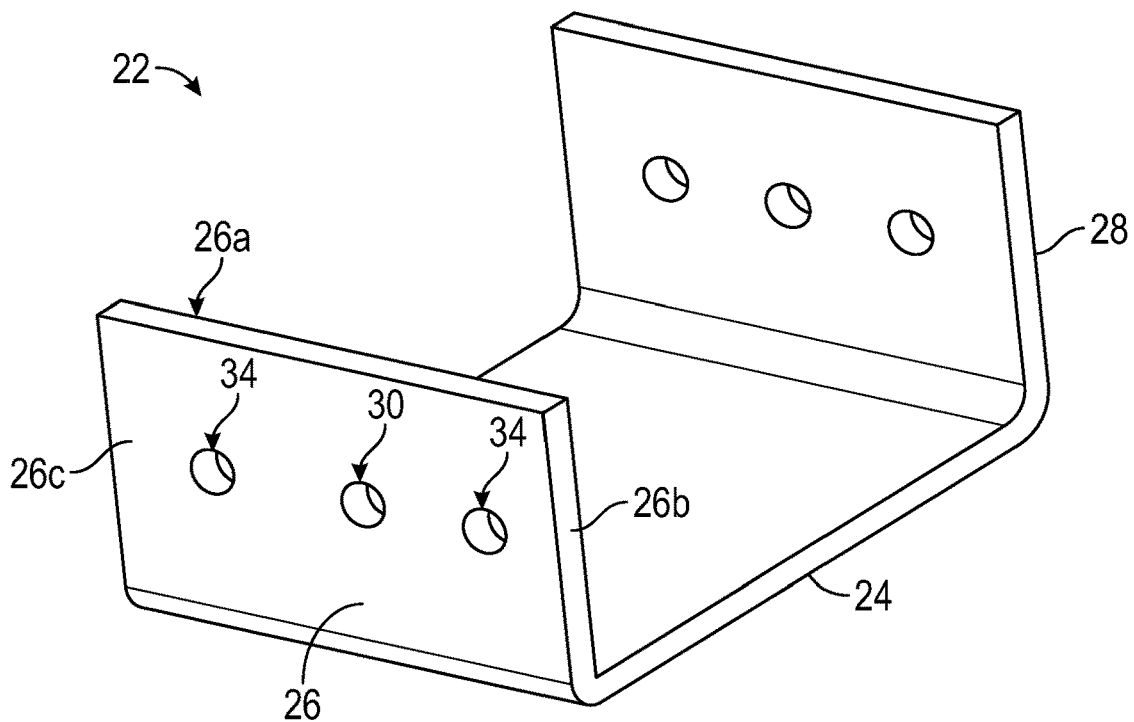
FIG. 5 is a perspective view of a support flange of the torque tube coupling of FIG. 4.

With reference to FIGS. 4-14, the torque tube coupling 20 includes a support flange 22, a swivel flange 40, an articulation joint 70, and a pair of cradles 130. With reference to FIGS. 4 and 5, the support flange 22 defines a generally U-shaped configuration having a backspan 24 extending between opposed vertical flanges 26 and 28, respectively. The backspan 24 of the support flange 22 is coupled to a corresponding pier 12 using any suitable means, such as fasteners, welding, adhesives, amongst others. The opposed vertical flanges 26, 28 are substantially similar to one another and therefore, only one vertical flange 26 will be described in detail herein in the interest of brevity. The vertical flange 26 extends from the backspan 24 and terminates at an end portion 26a. A bore 30 is defined through the vertical flange 26 adjacent the end portion 26a and is generally disposed at a central location between opposed front and rear portions 26b and 26c, respectively, although it is contemplated that the bore 30 may be disposed at any location on the vertical flange 26. The bore 30 rotatably supports a fastener 32 (FIG. 4) therethrough, which in turn, rotatably supports a portion of the swivel flange 40, as will be described in further detail hereinbelow. It is envisioned that the fastener 32 may be any suitable fastener capable of rotatably supporting the swivel flange 40, such as a bolt, pin, rivet, amongst others.

The vertical flange 26 includes a pair of through-holes 34 defined therethrough and disposed on opposing sides of the bore 30 (e.g., adjacent each of the front and rear portions 26b, 26c, respectively. The pair of through-holes 34 is configured to receive a corresponding locking fastener 36 (FIG. 4) therethrough. As will be described in further detail hereinbelow, the locking fastener 36 is configured to transition from an open position, where movement of the swivel flange 40 relative to the support flange 22 is permitted, to a locking position, where movement of the swivel flange 40 relative to the support flange 22 is inhibited. It is envisioned that the locking fastener 36 may be any suitable fastener, such as a nut and bolt, a rivet, amongst others. In one non-limiting embodiment, the locking fastener 36 is a Huck® Bobtail®, manufactured by Arconic Fastening Systems. It is envisioned that the locking fastener 36 may be secured to the vertical flange 26 in the factory or in the field during assembly.

Figure 6:
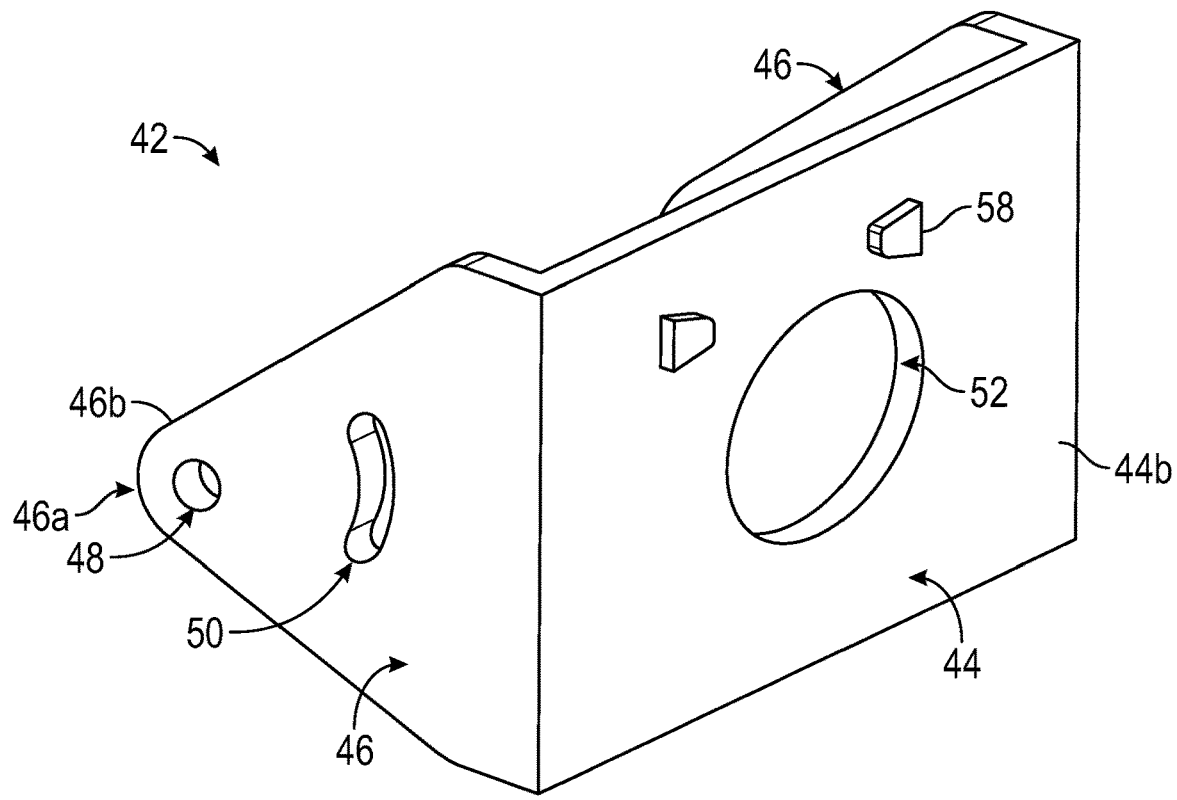
FIG. 6 is a perspective view of a swivel flange of the torque tube coupling of FIG. 4.
Figure 7:
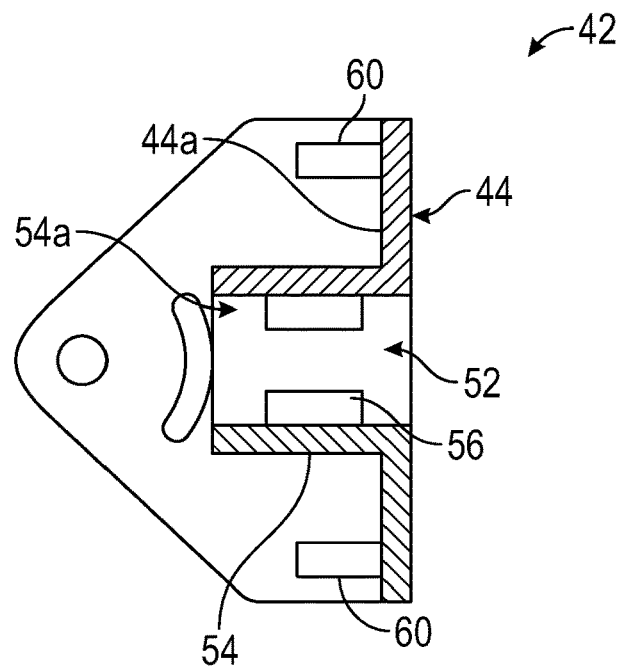
FIG. 7 is side, cross-sectional view, of the swivel flange of FIG. 6.
Figure 8:
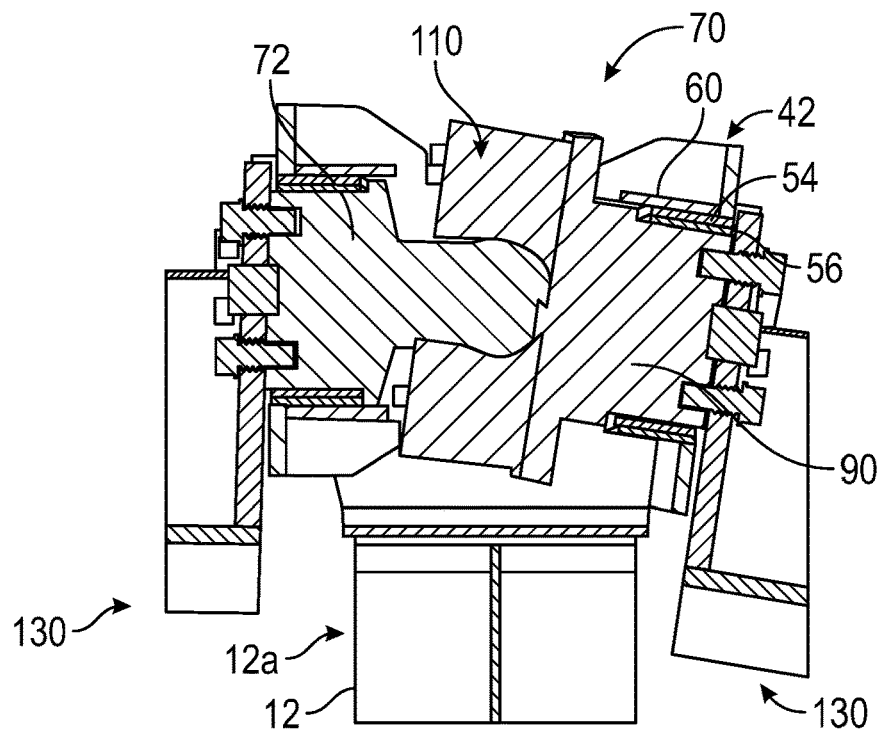
FIG. 8 is a side, cross-sectional view, of the torque tube coupling of FIG. 4.
Figure 9:
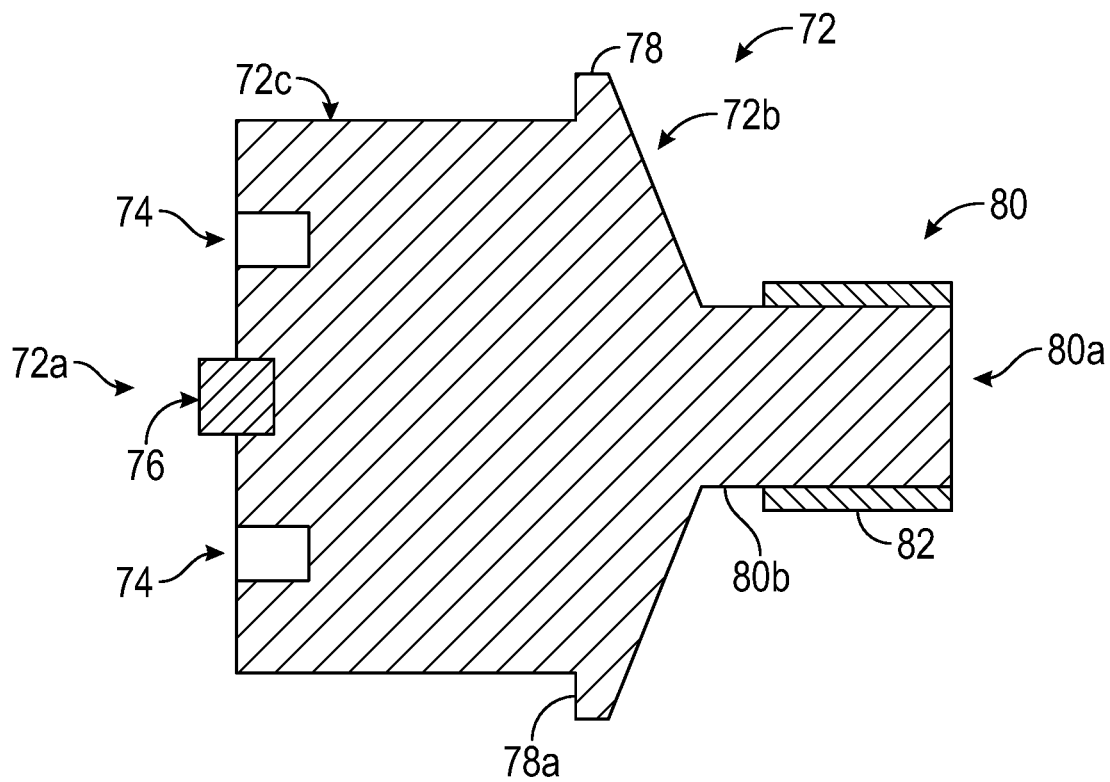
FIG. 9 is side, cross-sectional view, of a left CV flange of the torque tube coupling of FIG. 4.
Figure 10:
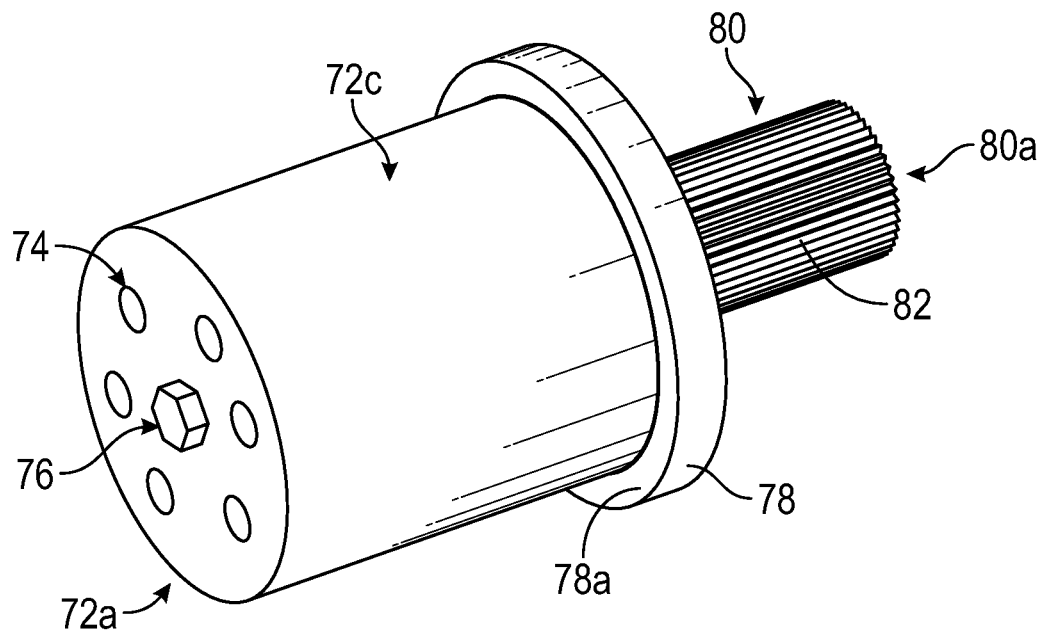
FIG. 10 is a perspective view of the left CV flange of FIG. 9.

With continued reference to FIG. 4 and with additional reference to FIGS. 6 and 7, the swivel flange 40 includes a pair of flanges 42 disposed in juxtaposed relationship to one another. Each flange of the pair of flanges 42 is substantially similar to one another and therefore, only one flange 42 will be described in detail herein in the interest of brevity. The flange 42 defines a generally U-shaped configuration having a backspan 44 extending between opposed legs 46. Each of the opposed legs 46 extends from the backspan and terminates at an end portion 46a. In embodiments, one or both of the opposed legs 46 defines a generally triangular shaped profile, having an apex 46b defined at the end portion 46a. As can be appreciated, the triangular shaped profile of the opposed legs 46 provides increased clearance against interference as each of the pair of flanges 42 is rotated relative to the support flange 22. Each of the opposed legs 46 includes a through-bore 48 defines therethrough adjacent the apex 46a that is configured to receive a portion of the fastener 32 therethrough.

Continuing with FIGS. 6 and 7, a slot 50 is defined through each of the opposed legs 46 between the through-bore 48 and the backspan 44 and is configured to receive a portion of the locking fastener 36 therethrough. The slot 50 includes a generally arcuate profile such that the radius is formed with the through-bore 48 towards its center (e.g., the curvature of the slot 50 follows an arc formed around the through-bore 48). The arcuate profile of the slot 50 enables the flange 42 to rotate about the fastener 30 disposed within the through-bore 48 a limited amount, depending upon the length of the slot 50, before the locking fastener 36 abuts one side of the slot 50 or the other. In one non-limiting embodiment, the length of the slot 50 enables the flange 42 to rotate relative to the support flange 22 up to 5 degrees, although it is contemplated that any suitable length of the slot 50 may be utilized, depending upon design needs.

The fastener 32 and the locking fasteners 36 permit the pair of flanges 42 to be rotated relative to the support flange 22 when the fastener 32 and the locking fasteners 36 are in a first, unlocked position. Once the desired angle of the pair of flanges 42 relative to the support 22 as been set, the fastener 32 and the locking fasteners 36 may be tightened to a second, locked position, where the pair of flanges 42 is inhibited from rotating relative to the support flange 22.

With continued reference to FIGS. 6 and 7, the backspan 44 of the flange 42 includes an aperture 52 defined therethrough that is configured to receive a portion of the articulation joint 70 (FIG. 4) therethrough. In this manner, the aperture 52 includes an inner dimension that enables the articulation joint 70 to rotate therewithin. An inner surface 44a of the backspan 44 includes a ring or boss 54 is disposed thereon that is substantially concentric with the aperture 52. The boss 54 includes an annular bore 54a defined therethrough that includes an inner dimension that is substantially similar to the inner dimension of the aperture 52, although it is contemplated that the annular bore 54a may include any suitable inner dimension that is configured to receive a portion of the articulation joint 70 therein. A bearing 56 is disposed within the annular bore 54a that is configured to rotatably support a portion of the articulation joint 70 therein. In this manner, the bearing 56 enables the articulation joint 70 to smoothly rotate within the bearing 56 and inhibit excessive wear or damage to both the flange 42 and the articulation joint 70. It is envisioned that the bearing 56 may be a bronze bushing (e.g., oil-embedded, sintered, amongst others), a brass bushing, a ceramic bushing, a polymeric bushing, amongst others, and may be a sleeve bushing or a flanged sleeve bushing. Although generally described as being a bushing, it is contemplated that the bearing 56 may be a ball bearing, needle bearing, or other suitable load bearing device. In embodiments where the bearing 56 is not a flanged bearing, it is contemplated that a thrust bearing or other suitable device capable of accepting an axial load while permitting rotation thereagainst may be utilized to axially locate the articulation joint 70 relative to the flange 42 and generally inhibit axial motion of the articulation joint 70 relative to the flange 42.

An outer surface 44b of the backspan 44 of the flange 42 includes a pair of stow stops 58 disposed thereon. The pair of stow stops 58 is disposed in spaced relation to one another and is selectively coupled to the outer surface 44b of the backspan 44 using any suitable means, such as fasteners, welding, adhesives, etc. As will be described in further detail hereinbelow, the pair of stow stops 58 is configured to limit rotational motion of the pair of cradles 130 (FIG. 4) to inhibit excess rotation of the torque tube 14 and limit excess stress placed upon the solar tracker 10.

In embodiments, the flange 42 may include one or more gussets 60 disposed on the inner surface 44a of the backspan and an inner surface 46a of an adjacent leg 46. As can be appreciated, the one or more gussets 60 stiffen or otherwise strengthen the flange 42. It is envisioned that the one or more gussets 60 may be coupled to the inner surface 44a of the backspan and the inner surface 46a of the leg 46 using any suitable means, such as fasteners, welding, adhesives, amongst others.

With reference to FIGS. 8-13, the articulation joint 70 includes a left CV flange 72, a right CV flange 90, and a CV joint assembly 110. The left CV flange 72 defines a generally cylindrical profile extending between a first end portion 72a and an opposite, second end portion 72b. The first end portion 72a includes a plurality of threaded holes 74 defined therein arranged in a generally circular configuration (e.g., a bolt circle) which is configured to threadably receive a respective fastener therein, as will be described in further detail hereinbelow. In embodiments the plurality of threaded holes includes six holes arranged in a bolt circle of 67 mm, although it is contemplated that any suitable number of holes may be utilized and any suitable bolt circle may be employed. The first end portion 72a includes a key 76 disposed thereon at a substantially central portion thereof. Although generally illustrated as having a hexagonal profile, it is contemplated that the key may include suitable profile, such as square, rectangular, pentagonal, amongst others. The key 76 is coupled to the first end portion 72a using any suitable means, such as fasteners, welding, adhesives, press fit, amongst others and is configured to engage a portion of a respective cradle of the pair of cradles 130 to key or otherwise inhibit movement of the cradle relative to the left CV flange 72, as will be described in further detail hereinbelow.

The left CV flange 72 defines an outer surface 72c that includes an outer dimension that is configured to be slidably and rotatably received within a portion of the bearing 56 such that the bearing 56 rotatably supports the left CV flange 72 therein. An annular flange 78 is disposed on the outer surface 72c of the left CV flange 72 and adjacent the second end portion 72b. The annular flange 78 defines an annular surface 78a adjacent the outer surface 72c of the left CV flange 72 that is configured abut or otherwise contact the bearing 56 or a thrust bearing to inhibit axial motion of the left CV flange 72 relative to the swivel flange 40.

An axle 80 is disposed on the second end portion 72b and extends therefrom terminating at an end portion 80a. The axle 80 is concentrically disposed on the second end portion 72b such that the axle 80 and the left CV flange 72 rotate about the same axis, although it is contemplated that the axle 80 may be disposed at any suitable location and may rotate about any suitable axis, depending upon design needs. An outer surface 80b of the axle defines a plurality of splines 82 that is configured to engage or otherwise be operably coupled to a corresponding feature of the CV joint assembly 110, as will be described in further detail hereinbelow.

Figure 11:
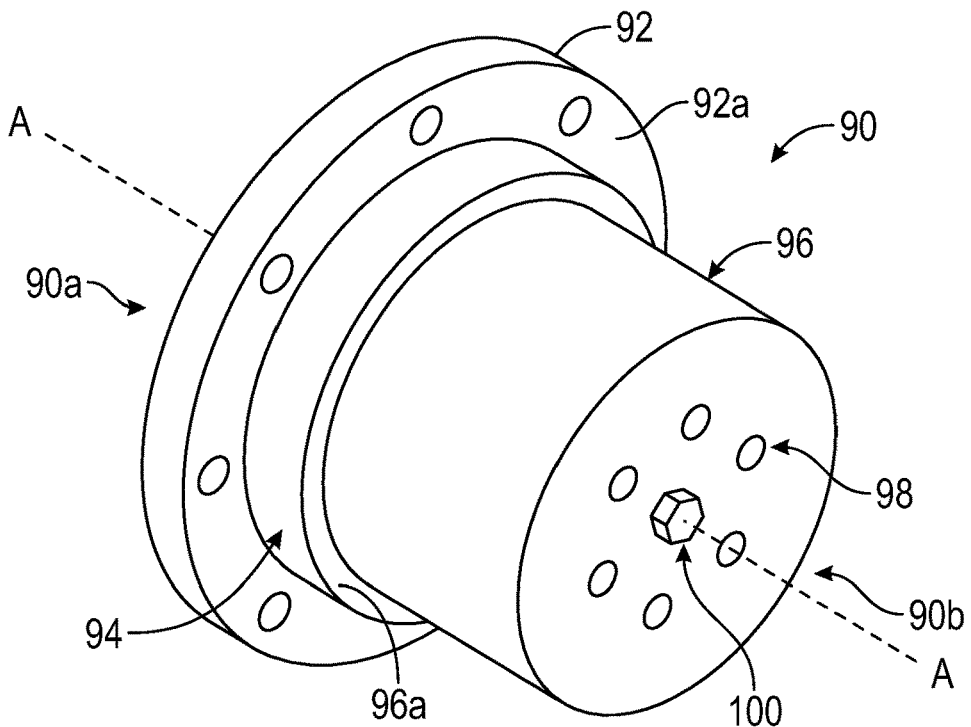
FIG. 11 is a perspective view of a right CV flange of the torque tube coupling of FIG. 4.
Figure 12:
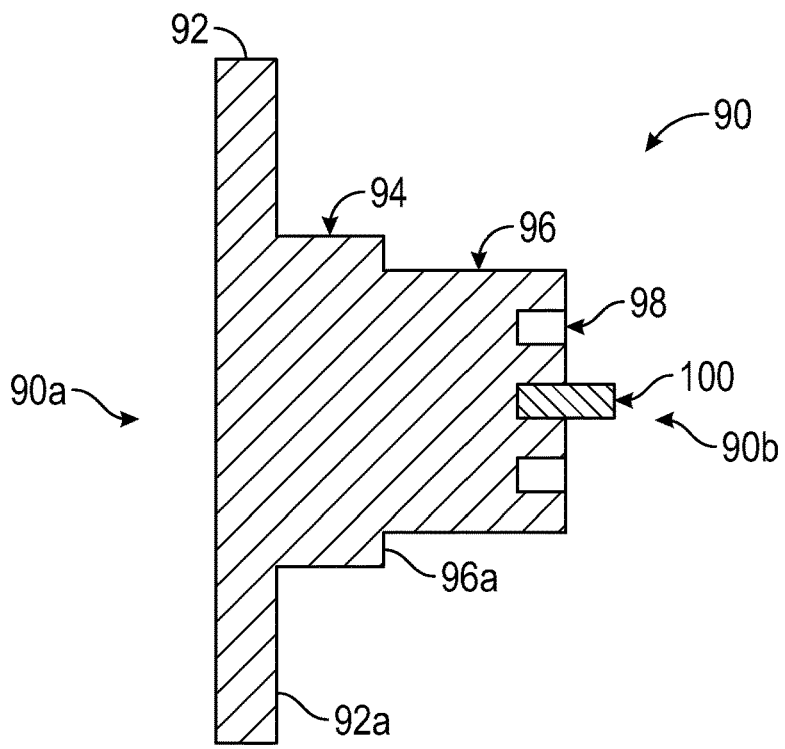
FIG. 12 is a side, cross-sectional view, of the right CV flange of FIG. 11.

With reference to FIGS. 11 and 12, the right CV flange 90 defines a top hat or generally T-shaped cross-sectional profile extending between a first end portion 90a and a second, opposite end portion 90b, defining a longitudinal axis A-A extending through a center portion thereof. The right CV flange 90 defines an annular flange 92 having a first outer dimension adjacent the first end portion 90a. The right CV flange 90 transitions to an intermediate portion 94 in a direction from the first end surface 90a towards the second end surface 90b along the longitudinal axis A-A which includes an outer dimension that is less than the flange 92. The annular flange 92 defines an annular surface 92a that is disposed adjacent the intermediate portion 94 and is generally perpendicular to the longitudinal axis A-A. The intermediate portion 94 of the right CV flange 90 transitions to a bearing support 96 extending from the intermediate portion 94 towards the second end portion 90b along the longitudinal axis A-A which includes an outer dimension that is less than the intermediate portion 94. The bearing support 96 is configured to be received within the bearing 56 of the swivel flange 40 to rotatably support the right CV flange 90. The transition from the intermediate portion 94 to the bearing support 96 defines an annular surface 96a that is generally perpendicular to the longitudinal axis A-A and is configured to abut a portion of the bearing 56 or a thrust bearing to inhibit axial motion of the right CV flange 90 along the longitudinal axis A-A relative to the swivel flange 40.

Continuing with FIGS. 11 and 12, the second end portion 90b of the right CV flange 90 includes a plurality of bolt holes 98 defined therein and arranged in a generally circular configuration about the longitudinal axis A-A (e.g., a bolt circle). In embodiments, the plurality of bolt holes 98 is arranged in a bolt circle of 67 mm. As can be appreciated, the plurality of bolt holes 98 include a threaded inner surface (not shown) that is configured to threadably engage a corresponding plurality of bolts to fixedly secure the right CV flange 90 to a respective cradle of the pair of cradles 130, such that rotation of the right CV flange 90 effectuates a corresponding rotation of the cradle 150, and vice versa.

The right CV flange 90 includes a key 100 disposed at a center portion of the second end portion 90 and extends longitudinally therefrom along the longitudinal axis A-A. The key 100 is generally axially aligned with the longitudinal axis A-A, although it is contemplated that the key 100 may be disposed at any location on the second end portion 90. Although generally illustrated as having a hexagonal profile, it is contemplated that the key 100 may include any suitable profile, such as square, rectangular, oval, pentagonal, amongst others. The key 100 is configured to be received within a corresponding keyhole defined through a portion of a respective cradle of the pair of cradles 130 to aid in ensuring that the cradle rotates about the same longitudinal axis as the key 100, as will be described in further detail hereinbelow. In embodiments, the key 100 may be disposed within a counterbore (not shown) defined within the second end portion 90b and may be coupled to the second end portion 90b using any suitable means, such as a press-fit, welding, adhesives, fasteners, amongst others.

Figure 13:
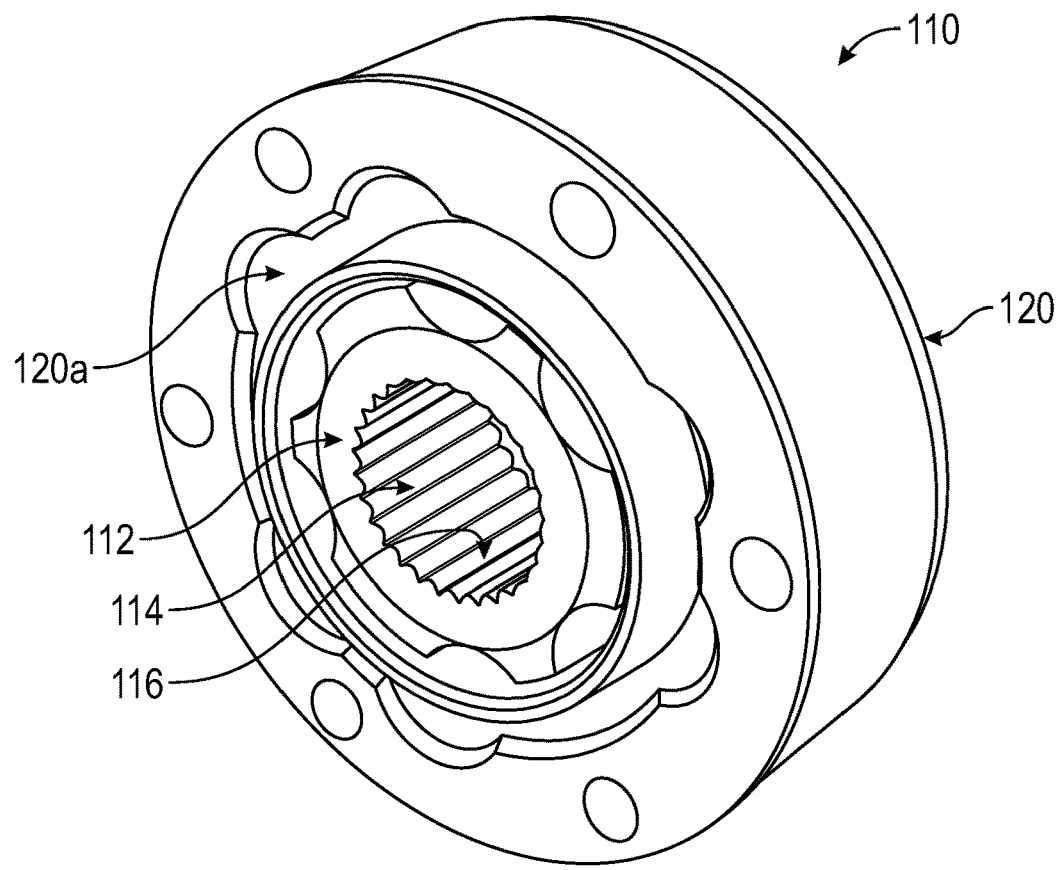
FIG. 13 is a perspective view of a CV joint assembly of the torque tube coupling of FIG. 4.

With reference to FIG. 13, the CV joint assembly 110 includes an inner shell 112 and an outer shell 120 rotatably coupled to the inner shell 112. The inner shell 112 defines a generally cylindrical profile and includes an inner bore 114 defined therethrough having a plurality of splines 116 defined therein, and in embodiments, disposed thereon, that is configured to engage the corresponding plurality of splines 82 of the left CV flange 72. Although generally described as having a cylindrical profile, it is envisioned that the inner shell 112 may include any suitable profile, such as hexagonal, pentagonal, square, amongst others. As can be appreciated, the plurality of splines 116 and the plurality of splines 82 cooperate to inhibit movement of the inner shell 112 relative to the left CV flange 72 (e.g., the inner shell 112 and the left CV flange 72 are rotatably coupled to one another such that rotation of the inner shell 112 effectuates a corresponding rotation of the left CV flange 72 and vice versa).

The outer shell 120 defines a generally cylindrical profile includes an outer dimension that is substantially similar to the outer dimension of the right CV flange 90, although it is contemplated that the outer shell 120 may include any suitable outer dimension and may define any suitable profile, such as hexagonal, pentagonal, oval, square, rectangular, amongst others. The outer shell 120 includes a through-hole 120a defined through a center portion thereof that includes an inner dimension that is configured to receive a portion of the inner shell 112 therein. As can be appreciated, the inner shell 112 is rotatably coupled to the outer shell 120 using any suitable means, such as a plurality of ball bearings, a plurality of roller bearings, amongst others. In this manner it is envisioned that the CV joint assembly 110 may be any suitable CV joint known in the art, such as a Rzeppa joint, a tracta joint, a tripod joint, a Birfield joint, double cardan joint, Thompson joint, amongst others, and in embodiments, may be a plunging CV joint or a non-plunging CV joint. In this manner, rotation of the inner shell 112 effectuates a corresponding rotation of the outer shell 120 at a generally constant velocity (e.g., no pulses or changes in velocity or differences in angle between the inner shell 112 to the outer shell 120 through rotation of the CV joint assembly), or vice versa. The outer shell 120 is releasably coupled to the right CV flange 90 using any suitable means, such as fasteners, welding, adhesives, press fit, amongst others such that rotation of the outer shell 120 effectuates a corresponding rotation of the right CV flange 90 and vice versa. Although generally described herein as utilizing a CV joint, it is contemplated that the articulation joint 70 may be any suitable mechanical joint, such as a U-joint, an elastic coupling, a beam coupling, a gear coupling, a Hirth joint, a magnetic coupling, an Oldham coupling, amongst others.

Figure 14:
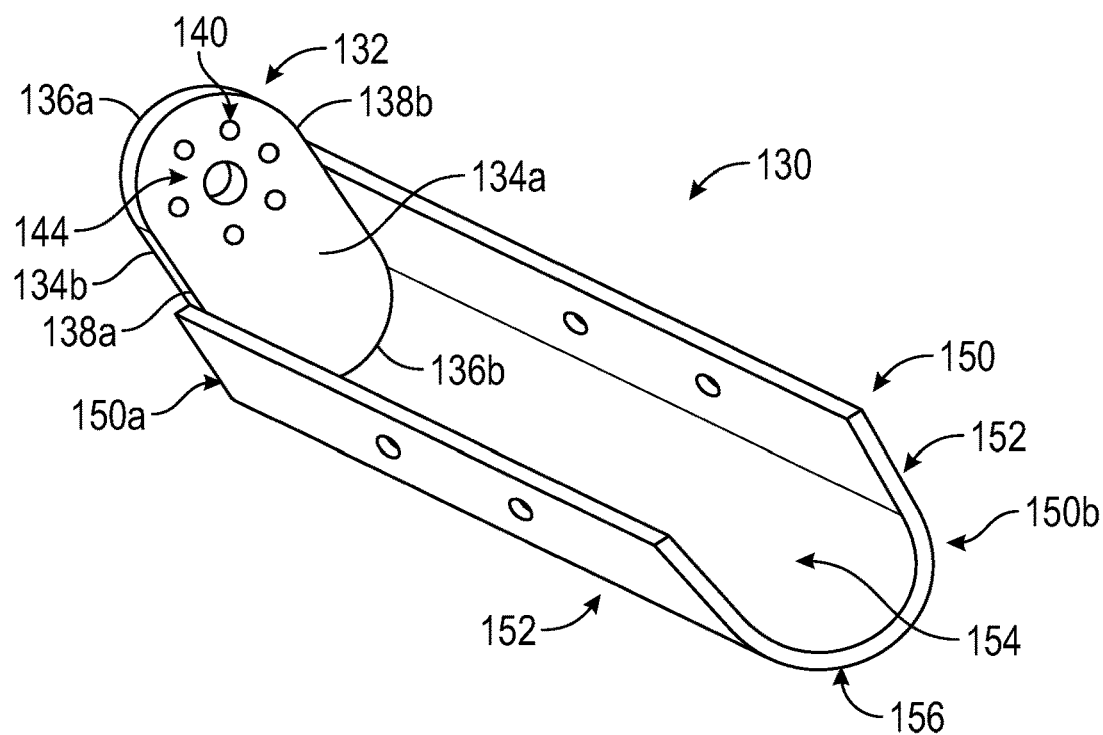
FIG. 14 is a perspective view of a torque tube cradle of the torque tube coupling of FIG. 4.

With reference to FIG. 14, each of the pair of cradles 130 is substantially similar and therefore only one cradle 130 will be described in detail herein in the interest of brevity. The cradle 130 includes a mounting flange 132 and a torque tube cradle 150 coupled to the mounting flange 132. The mounting flange 132 defines a generally planar configuration having a generally oblong or stadium profile, although it is contemplated that the mounting flange 132 may include a non-planar configuration (e.g., Z-shaped, L-shaped, amongst others) and may include any suitable profile, such as rectangular, oval, elliptical, circular, amongst others. The mounting flange 132 defines a front surface 134a and an opposite, back surface 134b, extending between opposed first and second end surfaces 136a, 136b and opposed first and second side surfaces 138a, 138b. The mounting flange 132 includes a plurality of through-holes 140 defined through the front and back surfaces 134a, 134b adjacent the first end surface 136a. The plurality of through-holes 140 is arranged in a circular configuration that generally corresponds to the plurality of bolt holes 98 of the right CV flange 90. In this manner, each of the plurality of through-holes 140 is configured to slidably receive a respective bolt or fastener 142 therethrough such that each respective fastener 142 is permitted to threadably engage each respective bolt hole of the plurality of bolt holes 98 and selectively secure the mounting flange 132 to the right CV flange 90. As can be appreciated, selectively securing the mounting flange 132 to the right CV flange 90 inhibits movement of the mounting flange 132 relative to the right CV flange 90 such that rotation of the mounting flange 132 effectuates a corresponding rotation of the right CV flange 90 and vice versa.

The mounting flange 132 includes a keyhole 144 defined through the front and back surfaces 134a, 134b at a location that is generally coaxial with an axis defined through the circular configuration of the plurality of bolt holes 98. The keyhole 144 defines a generally hexagonal profile and is configured to slidably receive a portion of the key 100 of the right CV flange 90. As can be appreciated, the keyhole 144 includes a profile that is substantially similar to the key 100 such to locate or otherwise ensure proper alignment of the mounting flange 132 to the right CV flange 90.

The first end surface 136a of the mounting flange 132 is configured to abut a respective stow stop of the pair of stow stops 58 of the swivel flange 40 to limit rotational movement of the mounting flange 132 and inhibit excess rotation of the torque tube 14, and therefore, excess stress placed upon the solar tracker 10. In this manner, as the mounting flange 132 is rotated in a first direction, a portion of the first end surface 136a abuts a first stow stop of the pair of stow stops 58 to inhibit further rotation of the mounting flange 132 in the first direction. As the mounting flange 132 is rotated in a second, opposite direction, a portion of the first end surface 136a abuts the second stow stop of the pair of stow stops 58 to inhibit further rotation of the mounting flange 132 in the second direction. In embodiments, the stow stops 58 are disposed at a location relative to the first end surface 136a of the mounting flange 132 such that the mounting flange 132 is limited to 58 degrees of rotation in either direction (e.g., a total of 106 degrees of rotation).

Figure 27:
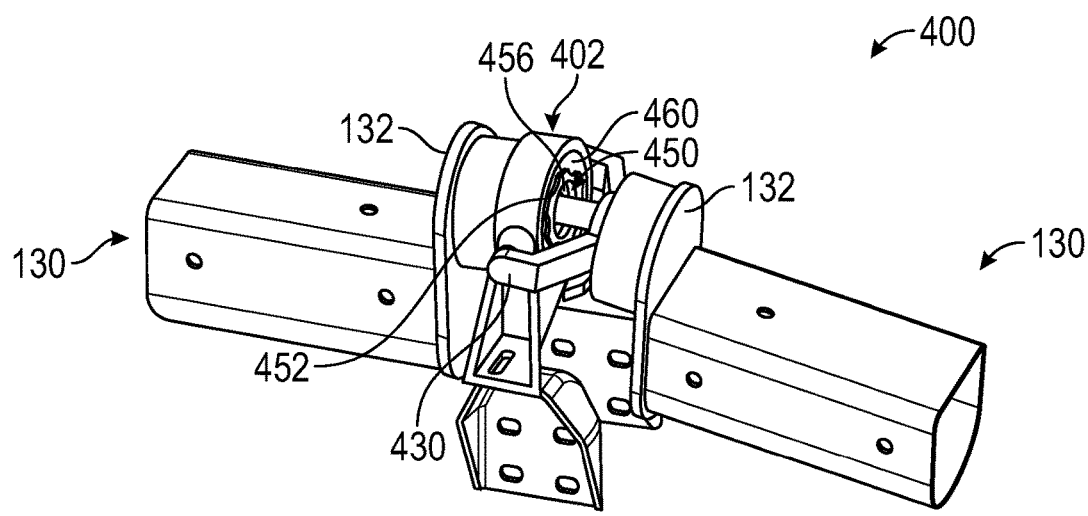
FIG. 27 is a perspective view of yet another embodiment of a torque tube coupling provided in accordance with the present disclosure.

With continued reference to FIG. 14, the torque tube cradle 150 defines a generally U-shaped profile that generally corresponds to the D-shaped profile of the torque tube 14. As can be appreciated, the torque tube 14 may include any suitable profile, such as circular, rectangular, square, oval, stadium, amongst others, and therefore, the torque tube cradle 150 may include a profile that is substantially similar to the profile of the torque tube 14 or may include a profile that is different that the profile of the torque tube 14. In embodiments, the torque tube cradle may define an enclosed D-shaped profile (FIG. 27) that is configured to be received within a cavity formed within the torque tube or slide over the torque tube (e.g., include a cavity therein for receiving a torque tube).

The torque tube cradle 150 defines a pair of spaced apart legs 152 defining a channel 154 therebetween and a crown 156 interconnecting the pair of spaced apart legs 152. As can be appreciated, the width of the channel 154 and the profile and location of the crown 156 may substantially correspond to the profile of the mounting flange 132, although it is contemplated that the width of the channel 154 and the location of the crown 156 may be any suitable dimension and may be the same or different than the profile of the mounting flange 132. The torque tube cradle 150 defines an elongate body extending between opposed first and second end portions, 150a and 150b, respectively. The first end portion 150a is fixedly coupled to the mounting flange 132 using any suitable means, such as fasteners, welding, adhesives, amongst others, and in embodiments, may be selectively coupled to the mounting flange 132.

The channel 154 of the torque tube cradle 150 is configured to receive a portion of the torque tube 14 therein and may be fixedly or releasably coupled to the torque tube 14 using any suitable means, such as fasteners, welding, adhesives, amongst others. In one non-limiting embodiment, the torque tube 14 is coupled to torque tube cradle 150 using fasteners such that the torque tube 14 may be secured to the torque tube cradle in the field or at any other suitable location. In this manner, the torque tube 14 is inhibited from rotating relative to the torque tube cradle 150 such that rotation of the torque tube 14 effectuates a corresponding rotation of the torque tube cradle 150 and vice versa.

Figure 15:
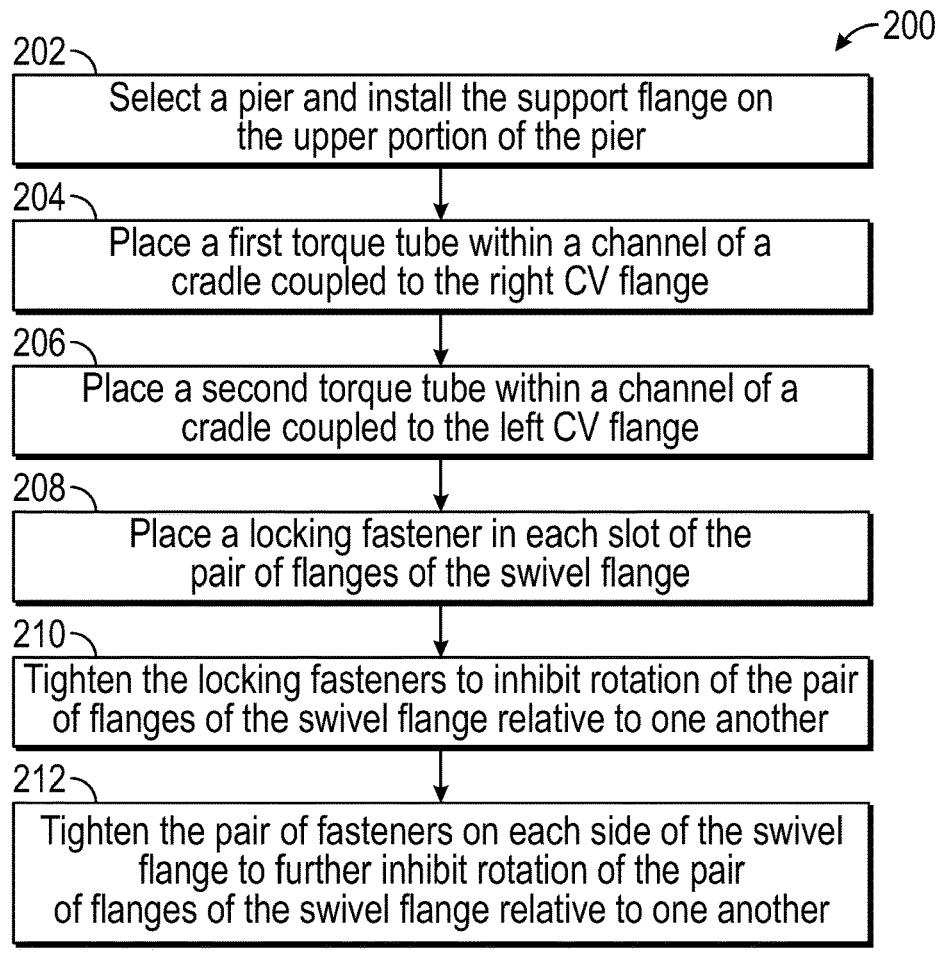
FIG. 15 is a flow diagram of a method of assembling the torque tube coupling of FIG. 4.
Figure 16:
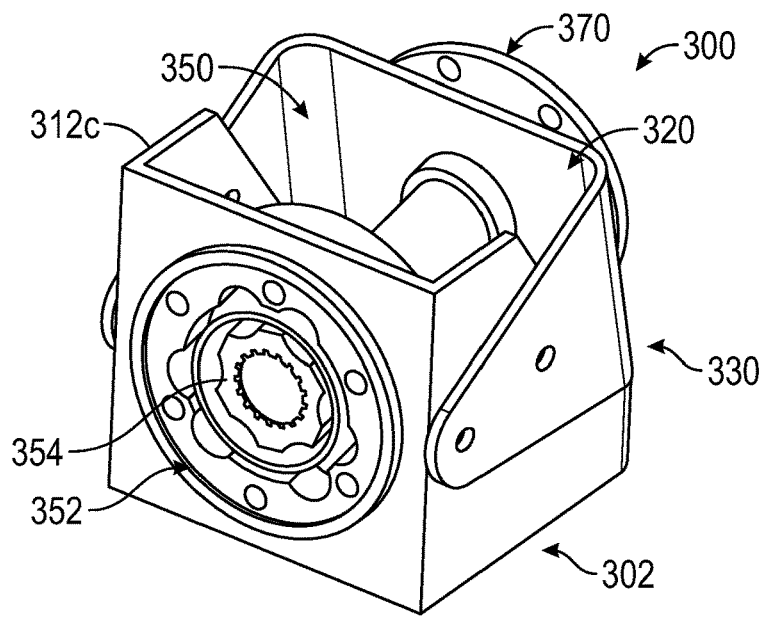
FIG. 16 is a rear, perspective view of another embodiment of a torque tube coupling provided in accordance with the present disclosure.
Figure 17:
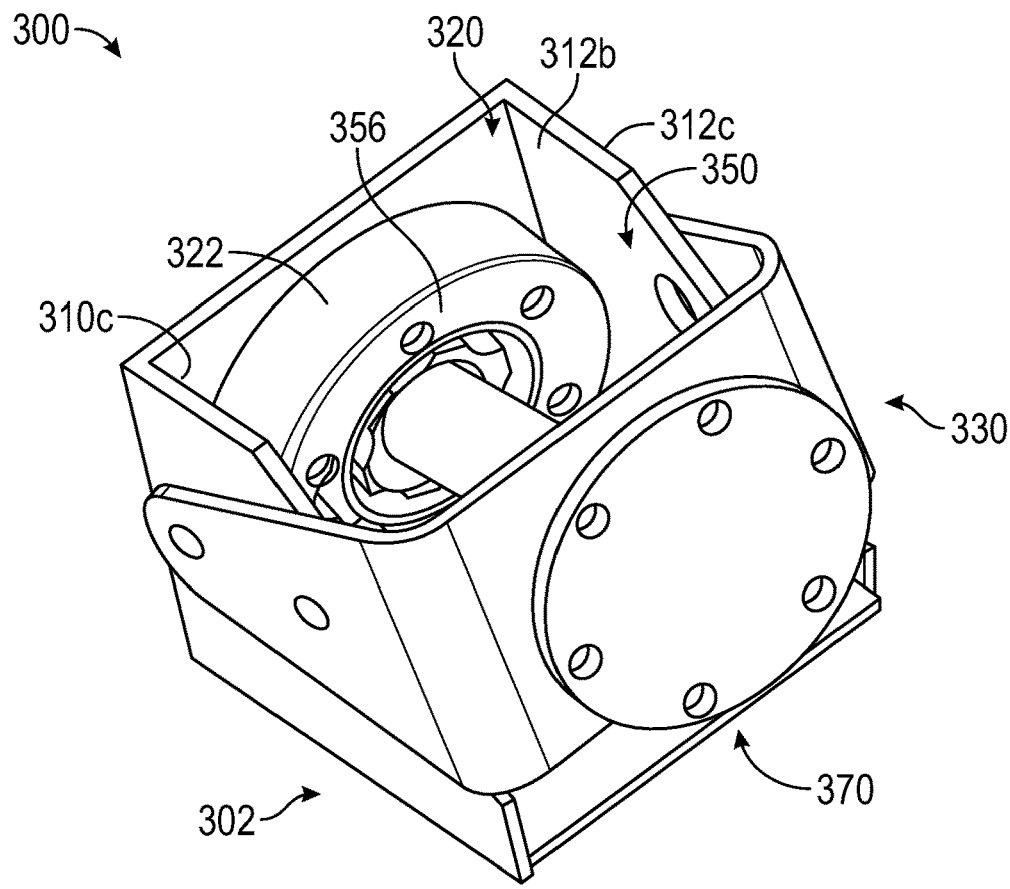
FIG. 17 is a top, perspective view of the torque tube coupling of FIG. 16.
Figure 18:
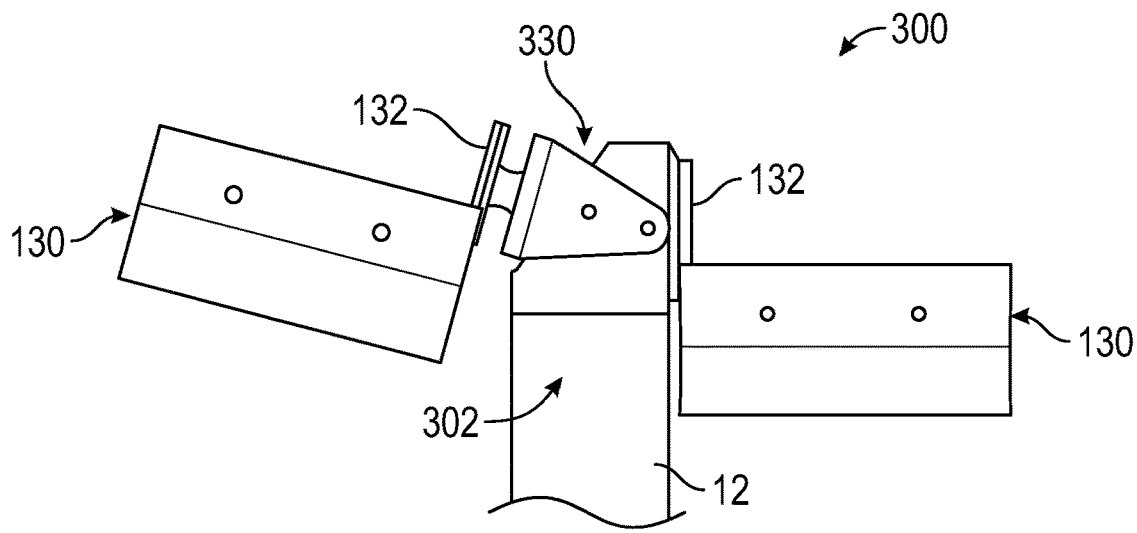
FIG. 18 is an elevation view of the torque tube coupling of FIG. 16.

With reference to FIGS. 1-14 and with additional reference to FIG. 15, a method 200 of assembling the torque tube coupling 20 is illustrated. Initially, the torque tube coupling 20 is substantially assembled at the factory or other suitable location before installation of the torque tube coupling 20 on the solar tracker 10. In this manner, the torque tube coupling 20 is preassembled with support flange 22 loosely coupled to the swivel flange 40 via the fastener 32 (which is present but not tightened) and the articulation joint 70 disposed within the support flange and the pair of cradles 120 coupled to each respective left and right CV flange 72 and 90.

In step 202, a pier 12 is selected and the support flange 22 is coupled to the upper portion 12a of the pier 12. As can be appreciated, it is not necessary for each pier of the plurality of piers 12 to include a torque tube coupler 20 coupled thereto. A torque tube coupler 20 is only necessary at locations where an angle between adjacent torque tubes 14 must be accounted for or where a user determines it is necessary. In step 204, a first torque tube 14 is placed within the channel 154 of a cradle 130 coupled to the right CV flange 90 and coupled thereto using any suitable means, such as fasteners, welding, adhesives, or the like. Thereafter, in step 206, a second torque tube 14 is placed within the channel 154 of a cradle 130 coupled to the left CV flange 72 and coupled thereto using any suitable means, such as fasteners, welding, adhesives, or the like. As can be appreciated, once the first and second torque tubes 14 have been coupled to respective cradles 130, the left and right CV flanges 72, 90 of the articulation joint 70 are caused to be placed at an appropriate angle relative to one another to accommodate the difference in angle between the first and second torque tubes. Once this angle has been established, in step 208, a locking fastener 36 is placed in each respective slot 50 of the pair of flanges 42 of the swivel flange 40. At this point, in step 210, the locking fasteners 36 are tightened to fix the angle of the pair of flanges 42, and thereby, the angle of the articulation joint 70. Once the locking fasteners 36 are tightened, in step 212, the fasteners 30 disposed on each side of the swivel flange 40 are tightened to inhibit rotation of each of the pair of flanges 42 relative to one another and inhibit a change in angle of the articulation joint 70. It is envisioned that this process may be repeated for each torque tube coupling 20 utilized in the solar tracker 10. Although generally described has being performed in a particular order, it is contemplated that the steps of the method of assembling the torque tube coupling 20 may be performed in any suitable order depending on installation needs.

With reference to FIGS. 16-26, another embodiment of a torque tube coupling is illustrated and generally identified by reference numeral 300. The torque tube coupling 300 includes a support flange 302, a swivel flange 330, and an articulation joint 350.

The support flange 302 includes a lower plate 304 having a generally planar, square profile having opposed upper and lower surfaces 304a, 304b extending between opposed first and second side portions 306a and 306b, respectively, and opposed first and second end portions 308a and 308b, respectively. Although generally described as having a square profile, it is contemplated that the lower plate 304 may define any suitable profile, such as rectangular, oval, circular, amongst others. The lower plate 304 of the support flange 302 is coupled to a corresponding pier 12 using any suitable means, such as fasteners, welding, adhesives, amongst others.

The support flange 302 includes opposed first and second side plates 310 and 312, respectively, disposed adjacent each of the first and second side portions 306a, 306b of the lower plate 304, which extend vertically from the upper surface 304a and terminate at an upper portion 310a, 312a, respectively. Each of the first and second side plates 310, 312 define respective inner and outer surfaces 310b, 312b and 310c, 312c, respectively. Each of the first and second side plates 310, 312 includes a chamfer 310d and 312d defined thereon adjacent the first end portion 308a, which permits rotation of the swivel flange 330 relative to the support flange 302 without interference, as will be described in further detail hereinbelow.

Each of the first and second side plates 310, 312 includes a pivot hole 314 defined therethrough adjacent the second end portion 308b that is configured to receive a portion of a respective fastener 32 (FIG. 4) therethrough. Although generally illustrated as being disposed at a mid-point between the upper surface 304a and the upper portion 310a, 312a, it is envisioned that the pivot hole 314 may be disposed at any suitable position between the upper surface 304a and the upper portion 310a, 312a, depending upon design needs. As can be appreciated, the location of the pivot hole 314 relative to a center or rotation of the articulation joint 350 can alter the relative arcuate paths through which the articulation joint 350 and the swivel flange 330 travel, thereby altering the amount of linear plunge the articulation joint 350 must accommodate. In this manner, with the location of the pivot hole 314 generally centered relative to the center of rotation of the articulation joint 350, the arcuate paths of both the articulation joint 350 and the swivel flange 330 are substantially similar, thereby minimizing plunge. Alternatively, with location of the pivot hole 314 offset from the center of rotation of the articulation joint 350, the arcuate paths of both the articulation joint 350 and the swivel flange 330 are different, causing increased plunge. In this manner, with the location of the pivot hole 314 generally aligned with the center of rotation of the articulation joint (e.g., the center of the CV assembly 352), the location of the pivot hole is offset from a center portion of the pier 12. As such, the pivot location of the torque tube coupling is offset from a center portion of the pier 12 to accommodate the position of the pier 12 relative to each torque tube 14 of the adjacent solar trackers 10 (e.g., ensure the pier 12 is generally centered between each adjacent solar tracker 10).

Each of the first and second side plates 310, 312 includes a slot 316 defined through each of the inner and outer surfaces 310b, 312b and 310c, 312c, respectively, that is configured to receive a portion of the locking fastener 36 therethrough. The slots 316 include a generally arcuate profile such that the radius is formed with the pivot holes 314 towards its center (e.g., the curvature of the slots 316 follows an arc formed around the pivot holes 314). The arcuate profile of the slots 316 enables the swivel flange 330 to rotate about fasteners disposed within the pivot holes 316 a limited amount, depending upon the length of the slots 316, before the locking fasteners 36 (FIG. 4) abut one side of the slots 316 or the other. In one non-limiting embodiment, the length of the slots 316 enables the swivel flange 330 to rotate relative to the support flange 302 up to 5 degrees, although it is contemplated that any suitable length of the slots 316 may be utilized, depending upon design needs.

Figure 19:
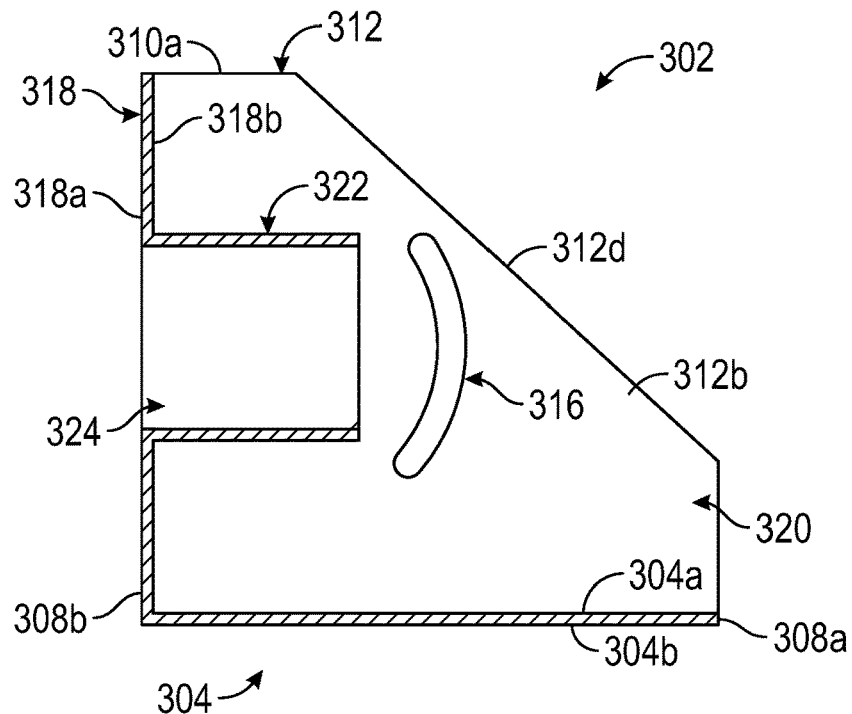
FIG. 19 is a side, cross-sectional view of a support flange of the torque tube coupling of FIG. 16.
Figure 20:
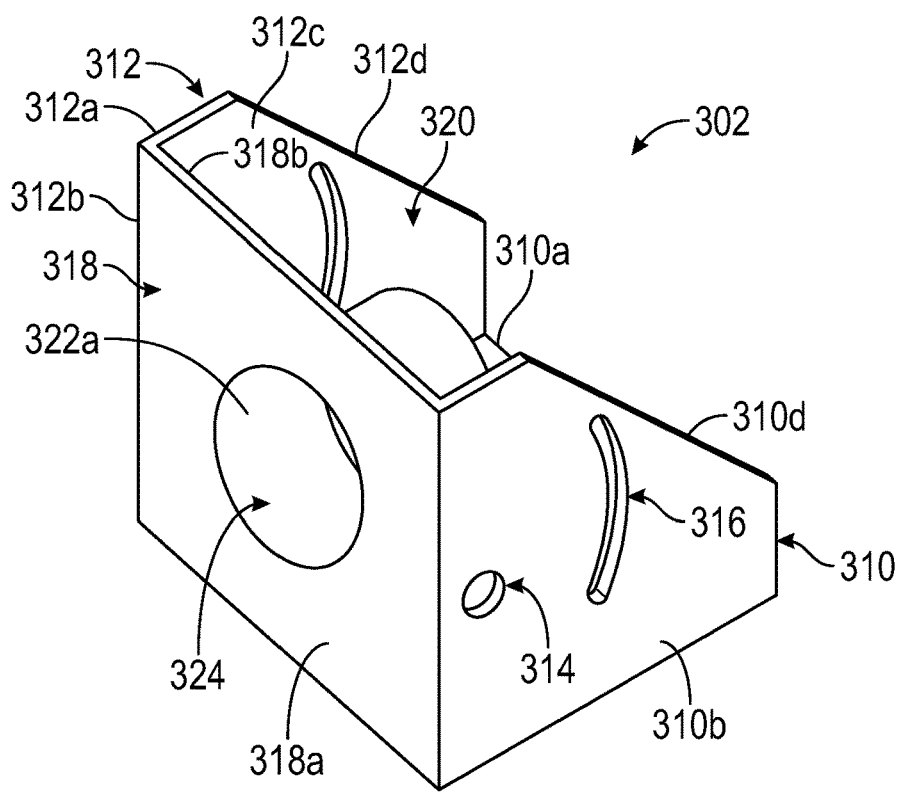
FIG. 20 is a rear, perspective view of the support flange of FIG. 19.

Continuing with FIGS. 19 and 20, the support flange 302 includes a support plate 318 interposed between the inner surfaces 310b, 312b of each of the opposed first and second side plates 310, 312 and the second end surface 308b of the lower plate 304 and extends vertically from the upper surface 304a. Although generally illustrated as terminating at a similar height as the first and second side plates 310, 312, it is contemplated that the support plate 318 may include any suitable height, and may be the same, higher, or lower than the height of the first and second side plates 310, 312. The support plate 318 defines an inner surface 318a and an opposite, outer surface 318b. As can be appreciated, a cavity 320 is formed within the space defined by the first and second side plates 310, 312 and the support plate 318 in which a portion of the articulation joint 350 is disposed, as will be described in further detail hereinbelow.

The support plate 318 includes a bearing housing 322 disposed on the inner surface 318a thereof. The bearing housing 322 includes an inner surface 322a defining a cavity 324 therein that extends through the inner and outer surfaces 318a, 318b of the support plate 318. The cavity 324 is configured to receive a radial bushing or bearing (not shown) therein to rotatably support a portion of the articulation joint 350, as will be described in further detail herein below. In embodiments, the inner surface 322a may define an annular flange (not shown) adjacent the outer surface 318b and extending radially inward from the inner surface 322a. In this manner, the annular flange inhibits axial movement of a portion of the articulation joint 350 towards the outer surface 318b when a portion of the articulation joint 350 is disposed within the cavity 324. In embodiments, the annular flange may be disposed at a location opposite from the outer surface 318b to inhibit axial movement of the articulation joint 350 away from the outer surface 318b. It is envisioned that a thrust bushing or bearing (not shown) may be disposed within the cavity 324 and abutting a portion of the annular flange to enable the articulation joint 350 to smoothly rotate within the bearing and inhibit excessive wear or damage to both the cavity 324, the annular flange, and the articulation joint 350. It is envisioned that the bearings may be bronze bushings (e.g., oil-embedded, sintered, amongst others), a brass bushing, a ceramic bushing, a polymeric bushing, amongst others, and may be a sleeve bushing or a flanged sleeve bushing. Although generally described as being a bushing, it is contemplated that the bearings may be ball bearings, needle bearings, or other suitable load bearing devices. In embodiments, the thrust bearing may be any suitable thrust bearing capable of accepting an axial load while permitting rotation thereagainst to axially locate the articulation joint 350 relative to the annular flange and generally inhibit axial motion of the articulation joint 350 relative to the annular flange.

Figure 21:
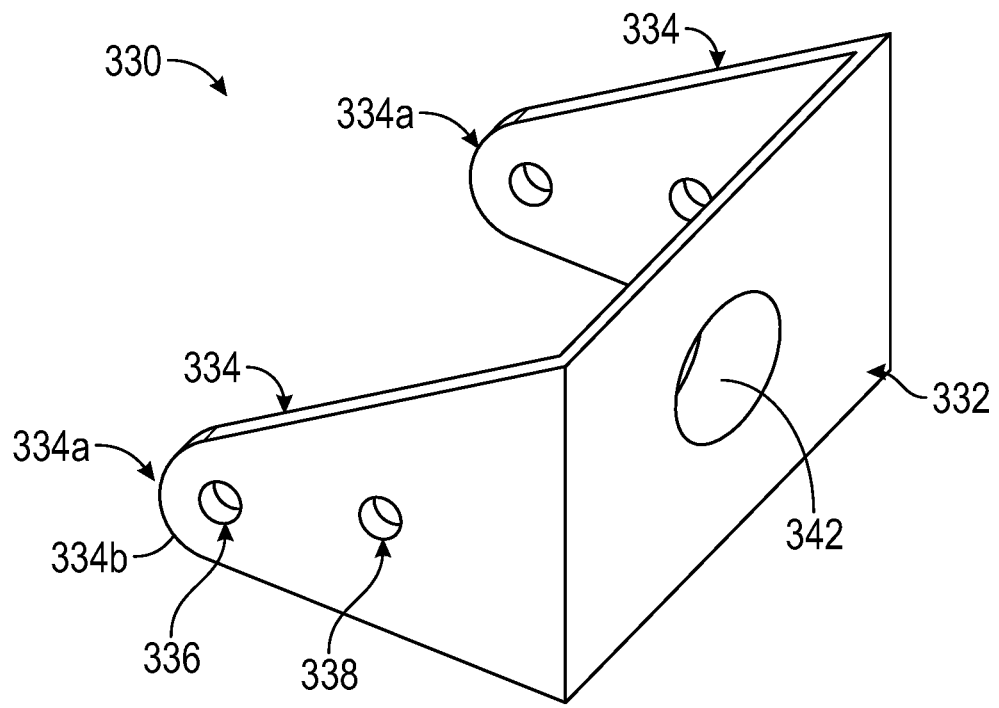
FIG. 21 is a front, perspective view of a swivel flange of the torque tube coupling of FIG. 16.
Figure 22:
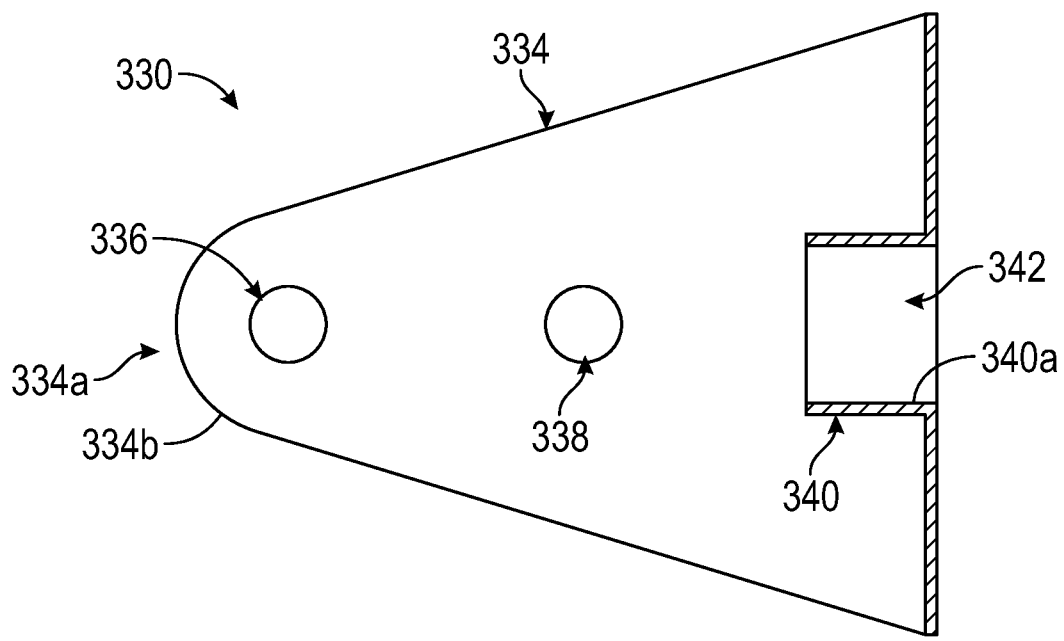
FIG. 22 is a side, cross-sectional view of the swivel flange of FIG. 21.
Figure 23:
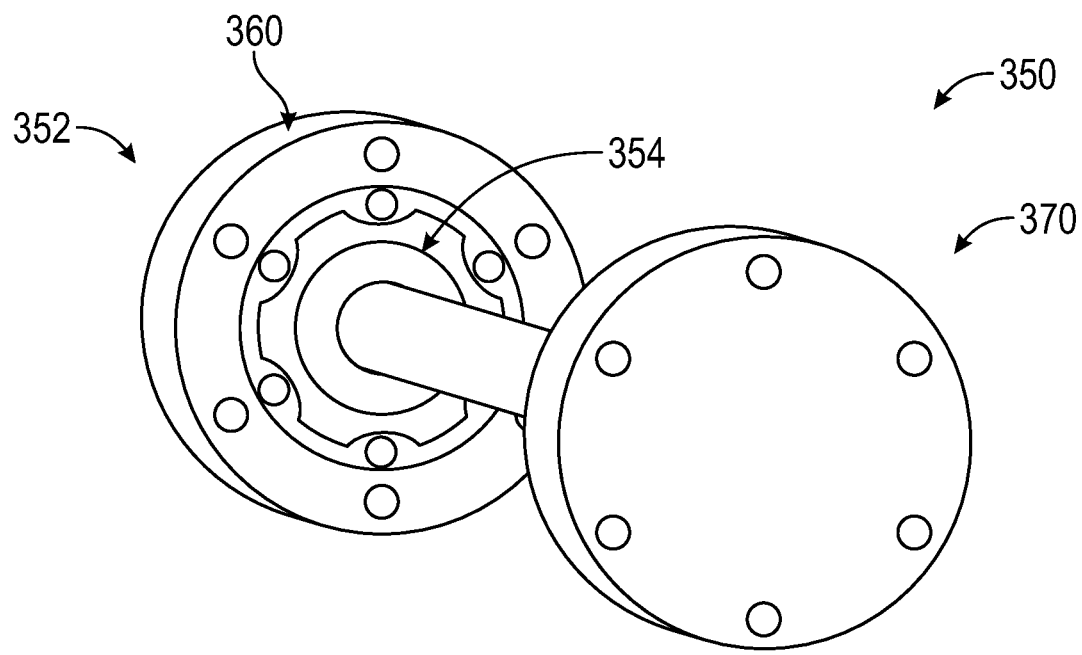
FIG. 23 is a perspective view of an articulation joint of the torque tube coupling of FIG. 16.
Figure 24:
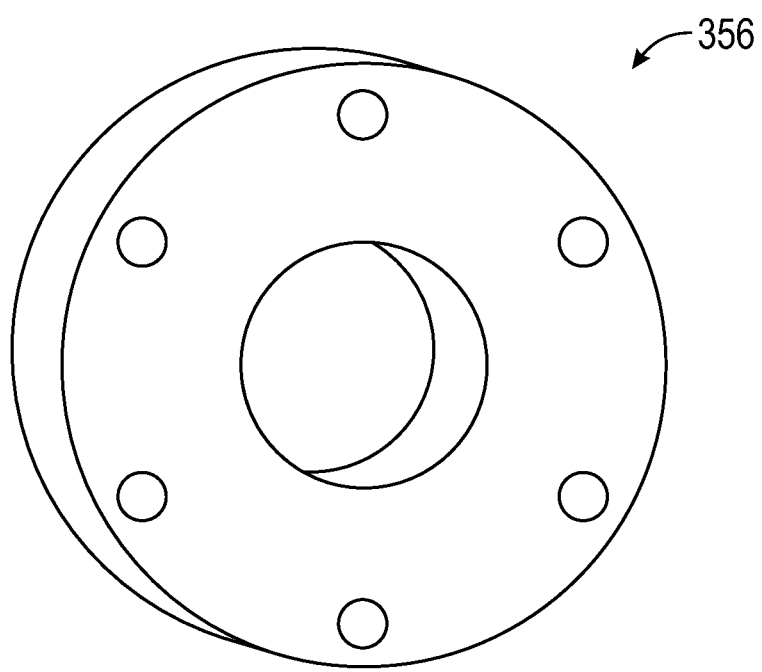
FIG. 24 is a perspective view of a retaining flange of the articulation joint of FIG. 23.

With reference to FIGS. 21 and 22, the swivel flange 330 defines a generally U-shaped configuration having a backspan 332 extending between opposed legs 334. Each of the opposed legs 334 extends from the backspan and terminates at an end portion 334a. In embodiments, one or both of the opposed legs 334 defines a generally triangular shaped profile, having an apex 334b defined at the end portion 334a. As can be appreciated, the triangular shaped profile of the opposed legs 334 provides increased clearance against interference as the swivel flange 330 is rotated relative to the support flange 302. Each of the opposed legs 334 includes a through-bore 336 defined therethrough adjacent the apex 334b that is configured to receive a portion of the fastener 32 therethrough. In this manner, the through-bore 336 is generally aligned with the pivot hole 314 of the support plate, such that when the fasteners 32 are received within each of the through-bore 336 and the pivot hole 314, the swivel plate 330 is permitted to rotate about the fastener 32 when the fastener 32 is placed in the first, open position, as will be described in further detail hereinbelow. Each of the opposed legs 334 includes a bore 338 defined therethrough at a location between the through-bore 336 and the backspan 332 and is configured to receive a portion of a respective locking fastener 36 therethrough. As can be appreciated, the bores 338 are disposed at a location that aligns with the slots 316 of the support flange 302 such that as the swivel flange 330 is rotated relative to the support flange 302, the locking fasteners 36 are caused to translate within the slots 316. In this manner, the fasteners 32 and the locking fasteners 36 permit the swivel flange 330 to be rotated relative to the support flange 302 when the fasteners 32 and the locking fasteners 36 are in a first, unlocked position. Once the desired angle of the swivel flange 330 relative to the support flange 302 has been set, the fastener 32 and the locking fasteners 36 may be tightened to a second, locked position, where the swivel flange 330 is inhibited from rotating relative to the support flange 302.

The backspan 332 of the swivel flange 330 includes a bearing housing 340 disposed thereon. The bearing housing 340 includes an inner surface 340a defining a cavity 342 therein that extends through each side of the backspan 332 of the swivel flange 330. In embodiments, the cavity 342 is configured to receive a bushing or bearing (not shown) therein to rotatably support a portion of the articulation joint 350, as will be described in further detail herein below.

With reference to FIGS. 16, 17, and 23-26, the articulation joint 350 includes a CV joint assembly 352 and a stub axle 370 operably coupled to the CV joint assembly 352. The CV joint assembly 352 is substantially similar to the CV joint assembly 110, and therefore only the differences therebetween will be described in detail herein in the interest of brevity. The CV joint assembly 352 includes an inner shell 354 and an outer shell 360. The outer shell 360 of the CV joint assembly 352 is rotatably supported within the cavity 324 of the bearing housing 322 such that the outer shell 360 is permitted to rotate relative to the support flange 302. In embodiments where the bearing housing 322 includes an annular flange, a portion of the outer shell 360 of the CV joint assembly 352 abuts a portion of the thrust bearing (not shown) abutting a portion of the annular flange to inhibit axial movement of the outer shell 360 of the CV joint assembly 352 towards or away from the outer surface 318b of the support flange, depending upon the location of the annular flange within the cavity 324.

The outer shell 360 of the CV joint assembly 352 is axially restrained within the cavity 324 of the bearing housing 322 using a retaining flange 356 disposed within the cavity 320 of the support flange 302 (e.g., at a location opposite the outer surface 318b) and a corresponding mounting flange 132 of a cradle 130 coupled to the outer shell 360 of the CV joint assembly 352 adjacent the outer surface 318b to sandwich or otherwise inhibit axial movement of the outer shell 360 relative to the support flange 302.

The retaining flange 356 includes a generally planar, circular profile, although it is contemplated that the retaining flange 356 may include any suitable profile, such as oval, pentagonal, octagonal, square, rectangular, amongst others. The retaining flange 356 includes an outer dimension that is greater than the outer dimension of the outer shell 360 such that when the outer shell 360 is disposed within the cavity 324 of the bearing housing 322 and the retaining flange 356 is coupled to the outer shell 360, a portion of the retaining flange 356 abuts a corresponding portion of the bearing housing 322 to inhibit axial motion of the outer shell 360 towards the outer surface 318b of the support flange 302. As can be appreciated, a thrust bearing or bushing (not shown) may be interposed between the retaining flange 356 and the bearing housing 322 to enable the outer shell 360 to smoothly rotate along with the retaining flange 356 relative to the bearing housing 322 and inhibit excessive wear or damage to the retaining flange 356 and/or the bearing housing 322.

Similarly, the outer dimension of the mounting flange 132 of the cradle 130 is greater than the outer dimension of the outer shell 360 such that when the outer shell 360 is disposed within the cavity 324 of the bearing housing 322 and the mounting flange 132 is coupled to the outer shell 360, a portion of the mounting flange abuts a corresponding portion of the bearing housing 322 to inhibit axial motion of the outer shell 360 towards the cavity 320 of the support flange 302. As can be appreciated, a thrust bearing or bushing (not shown) may be interposed between the mounting flange 132 and the bearing housing 322 to enable the outer shell 360 to smoothly rotate along with the mounting flange 132 relative to the bearing housing 322 and inhibit excessive wear or damage to the mounting flange 132 and/or the bearing housing 322.

Figure 25:
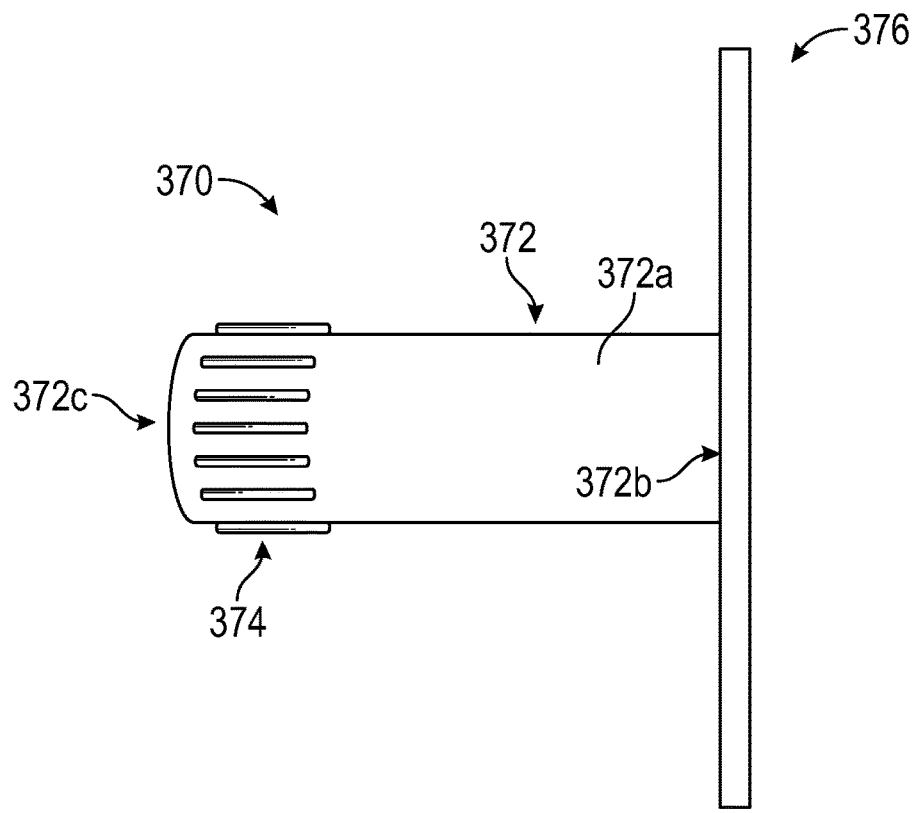
FIG. 25 is an elevation view of a stub axle of the articulation joint of FIG. 23.
Figure 26:
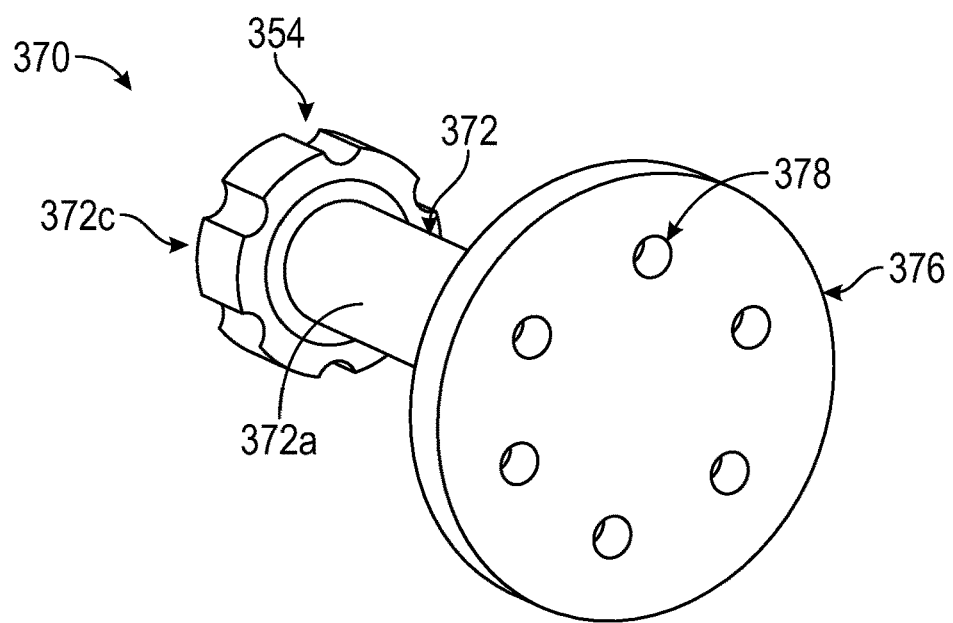
FIG. 26 is a perspective view of an alternate embodiment of the stub axle of FIG. 25.

Continuing with FIGS. 25 and 26, the stub axle 370 includes an axle 372 having an outer surface 372a extending between opposed first and second end portions 372b and 372c, respectively. The outer surface 372a includes an outer dimension that is configured to be received within the cavity 342 of the bearing housing 340 of the swivel flange 330 such that the stub axle is rotatably supported therein. The outer surface 372a includes plurality of splines 374 disposed thereon adjacent the second end portion 372c that is configured to operably engage a corresponding plurality of splines (not shown) defined on a portion of the inner shell 354 such that rotation of the inner shell 354 effectuates a corresponding rotation of the axle 372 and vice versa. Although generally described as being disposed on the outer surface 372a of the axle 372, it is contemplated that the plurality of spines 374 may be formed within the outer surface 372a of the axle 372, depending upon design needs.

In embodiments, it is envisioned that the inner shell 354 may be formed on the outer surface 372a of the axle 372 or may be otherwise coupled thereto using any suitable means, such as welding, fasteners, adhesives, or the like. As can be appreciated by forming the inner shell 354 on the outer surface 372a of the axle 372, the strength of the articulation joint 350 is increased by omitting the plurality of splines (e.g., the torque capacity of the axle is increased). The axle 372 includes an outer dimension that is configured to be slidably and rotatably received within the bearing (not shown) disposed within the cavity 340 of the bearing housing 338 of the swivel flange 330.

The stub axle 370 includes a mounting flange 376 disposed adjacent to the first end portion 372b. The mounting flange 376 defines a generally circular profile having a planar configuration, although it is contemplated that any suitable profile and configuration may be utilized, such as square, rectangular, hexagonal, amongst others, and the profile of the mounting flange 376 may be the same or different than that of the mounting flange 132 of a corresponding cradle 130. The mounting flange 376 includes a plurality of bolt holes 378 defined therein and arranged in a generally circular configuration (e.g., a bolt circle) substantially similar to the bolt circle of the plurality of through-holes 140 of the mounting flange 132 of the cradle 130 such that the mounting flange 376 may be selectively coupled to the mounting flange 132 using fasteners (not shown) or the like.

Turning to FIGS. 27-30, another embodiment of a torque tube coupling is illustrated and generally identified by reference numeral 400. The torque tube coupling 400 includes a bearing housing assembly 402, a gimbal 430, and an articulation joint 450.

The bearing housing assembly 402 defines a generally D-shaped profile having opposed first and second end surfaces 402a and 402b, respectively, extending between opposed first and second side surfaces 404a and 404b, respectively, a bottom surface 406 interposed between the first and second side surfaces 404a, 404b, and an arcuate upper surface 408 interposed between the first and second side surfaces 404a, 404b and disposed opposite to the bottom surface 406.

The bearing housing assembly 402 includes an inner surface 410 defining a through-bore 410a extending through each of the first and second end surfaces 402a, 402b and being disposed adjacent the arcuate upper surface 408. The through-bore 410a includes an inner dimension that is configured to receive a portion of the articulation joint 450 therein. In embodiments, the through-bore 410a may include a bearing or bushing (not shown) disposed therein that is interposed between the inner surface 410 and the articulation joint 450 such that the articulation joint 450 is rotatably supported within the through-bore 410a. In embodiments, the inner surface 410 may define an annular flange (not shown) adjacent one of the first or second end surfaces 402a, 402b and extending radially inward from the inner surface 410. In this manner, the annular flange inhibits axial movement of a portion of the articulation joint 450 towards the first or second end surface 402a, 402b, depending on the position of the annular flange on the inner surface 410. It is envisioned that a thrust bushing or bearing (not shown) may be disposed within the through-bore 410a and abutting a portion of the annular flange to enable the articulation joint 450 to smoothly rotate within the bearing and inhibit excessive wear or damage to both the through-bore 410a, the annular flange, and the articulation joint 450. It is envisioned that the bearings may be bronze bushings (e.g., oil-embedded, sintered, amongst others), a brass bushing, a ceramic bushing, a polymeric bushing, amongst others, and may be a sleeve bushing or a flanged sleeve bushing. Although generally described as being a bushing, it is contemplated that the bearings may be ball bearings, needle bearings, or other suitable load bearing devices. In embodiments, the thrust bearing may be any suitable thrust bearing capable of accepting an axial load while permitting rotation thereagainst to axially locate the articulation joint 450 relative to the annular flange and generally inhibit axial motion of the articulation joint 450 relative to the annular flange.

The bearing housing assembly 402 includes a pair of mounting flanges 412 disposed on each of the first and second side surfaces 404a, 404b adjacent the bottom surface 406. Each of the pair of mounting flanges 412 is substantially similar and therefore only one mounting flange 412 will be described herein in the interest of brevity. The mounting flange 412 defines a generally U-shaped profile having a planar lower portion 412a interposed between a pair of flanges 412b extending vertically therefrom. The lower portion 412a includes a mounting hole 412c defined therethrough that is configured to receive a portion of a respective fastener therethrough to releasably couple the bearing housing assembly 402 to a pier 12. Although generally illustrated as having an oval or racetrack configuration, it is envisioned that the mounting hole 412c may include any suitable profile, such as circular, square, rectangular, amongst others, depending upon design needs. It is contemplated that the mounting flange 412 may be coupled to the first side surface 404a using any suitable means, such as fasteners, welding, adhesives, amongst others, and in embodiments, may be integrally formed with the bearing housing assembly 402 (e.g., machined, molded, or cast as a single piece).

The bearing housing assembly 402 includes a pair of gimbal mounts 414 disposed on each of the first and second side surfaces 404a, 404b at a location that is generally aligned with a center axis of the through-bore 410a. Each of the pair of gimbal mounts 414 is substantially similar and therefore, only one gimbal mount 414 will be described herein in the interest of brevity. The gimbal mount 414 defines a generally conical frustum profile extending from the first side surface 404a and terminating at an end surface 414a. Although generally described as having conical frustum profile, it is envisioned that the gimbal mount 414 may define any suitable profile, such as cylindrical, rectangular, cube, pentagonal, amongst others. The end surface 414a of the gimbal mount 414 defines a cavity 416 therein that is configured to receive a portion of the gimbal 430 therein such that the gimbal 430 is rotatably supported relative to the bearing housing assembly 402. It is contemplated that the cavity 416 may include a bearing or bushing (not shown) disposed therein to rotatably support the gimbal 430. It is envisioned that the gimbal mount 414 may be coupled to the bearing housing assembly 402 using any suitable means, such as welding, adhesives, fasteners, amongst others, and in embodiments, may be integrally formed with the bearing housing assembly 402 (e.g., machined, molded, or cast as a single piece).

Similar to the torque tube coupling 300 described hereinabove, the location of the cavity 416 of the gimbal mounts 414 is generally centered relative to the center of rotation of the CV joint assembly 452 to minimize plunge effectuated by differing centers of rotation between the CV joint assembly 452 and the stub axle 470. As such, the location of the cavity 416 of the gimbal mounts 414 is offset from a center portion of the pier 12 to accommodate the position of the pier 12 relative to each torque tube 14 of the adjacent solar trackers 10 (e.g., to ensure the pier 12 is generally centered between each adjacent solar tracker 10).

Figure 30:
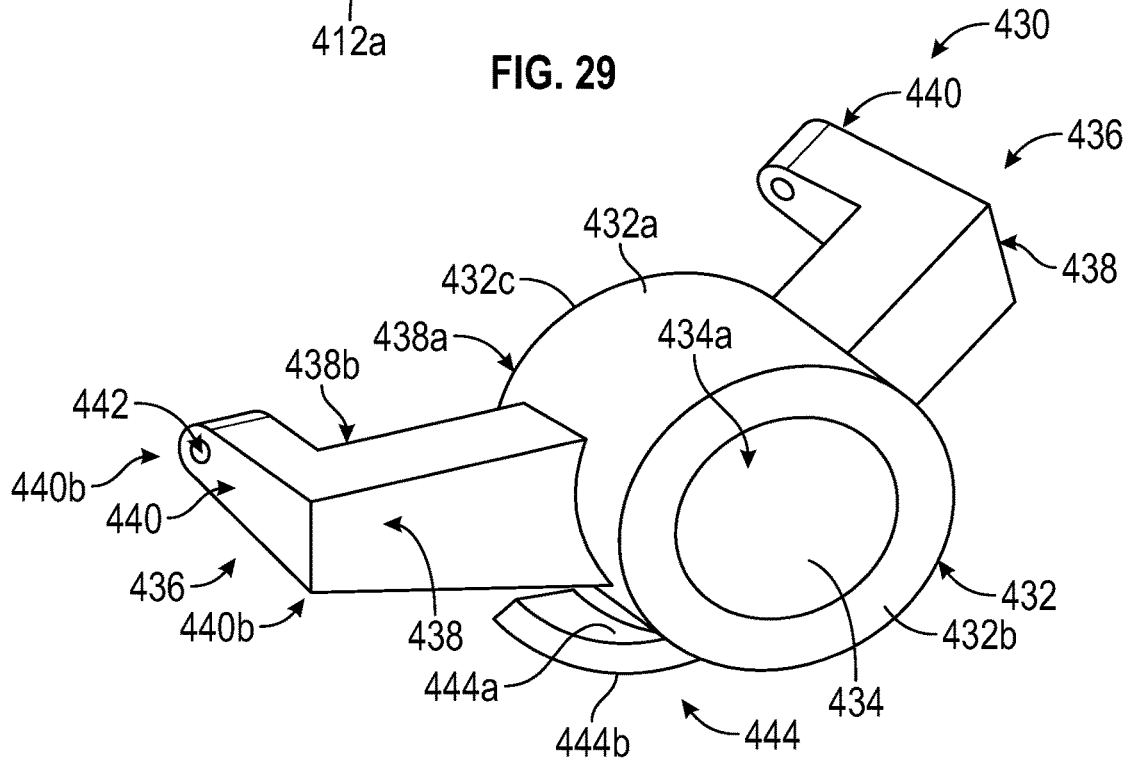
FIG. 30 is a perspective view of a gimbal of the torque tube coupling of FIG. 27.

With reference to FIG. 30, the gimbal 430 includes a bearing housing 432 having an outer surface 432a extending between opposed first and second end surfaces 432b and 432c, respectively. The bearing housing 432 includes an inner surface 434 defining a through-hole 434a extending through the first and second end surfaces 432b, 432c that is configured to rotatably receive a portion of the articulation join 450 therein, as will be described in further detail hereinbelow. In embodiments, the bearing housing 432 may include a bearing or bushing (not shown) disposed within the through-hole 434a to rotatably support a portion of the articulation joint 450 therein.

The gimbal 430 includes a pair of arms 436 disposed on the outer surface 432a of the bearing housing 432 in a juxtaposed relationship (e.g., opposing sides of the bearing housing 432). Each of the pair of arms 436 is substantially similar and therefore, only one arm of the pair of arms 436 will be described in detail herein in the interest of brevity. The arm 436 defines a generally L-shaped profile having a leg 438 and a foot 440. The leg 438 includes an elongate body extending between opposed first and second end portions 438a and 438b, respectively. The first end portion 438a is coupled to the outer surface 432a of the bearing housing 432 using any suitable means, such as welding, adhesives, fasteners, amongst others, an in embodiments may be integrally formed with the bearing housing 432. The foot 440 includes an elongate body extending between opposed first and second end portions 440a and 440b, respectively. The first end portion 440a of the foot 440 is coupled to the second end portion 438b of the leg 438 and extends at an oblique angle therefrom, although it is envisioned that the foot 440 may define any suitable angle relative to the leg 438, such as acute, perpendicular, amongst others. The foot 440 includes a bore 442 defined therethrough adjacent the second end portion 440b that generally corresponds to the cavity 416 of the gimbal mount 414 such that a fastener (not shown) or the like may be received through the bore 442 of the foot and into the cavity 416 of the gimbal mount 414 to rotatably support the gimbal 430. In embodiments, the foot 440 may define a boss (not shown) thereon that is configured to be received within the cavity 416 of the gimbal mount 414. As can be appreciated, the pair of arms 436 cooperate with the pair of gimbal mounts 414 to rotatably support the gimbal 430 on the bearing housing assembly 402.

Figure 28:
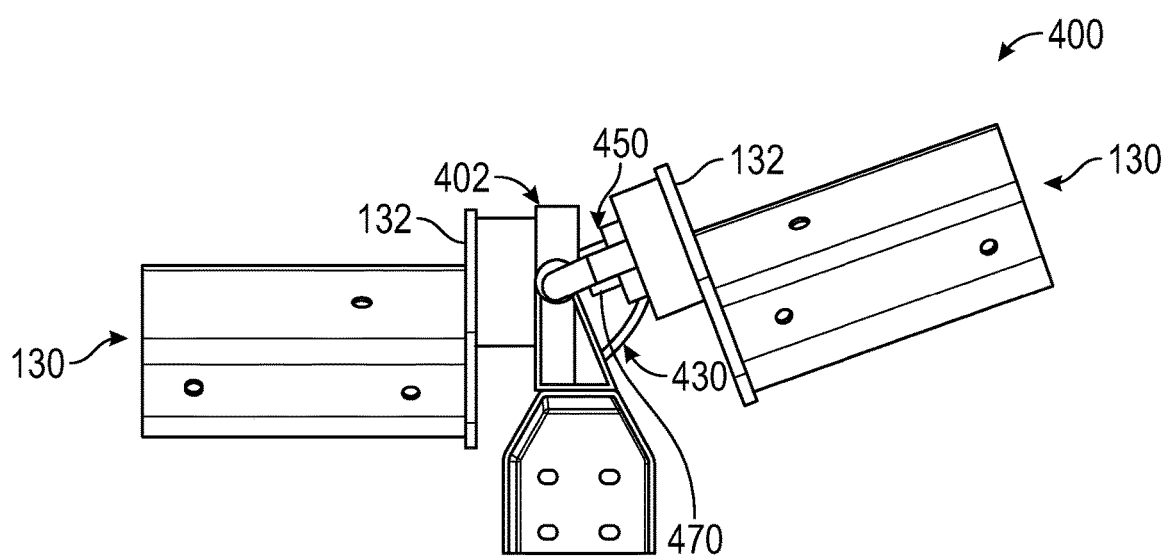
FIG. 28 is an elevation view of the torque tube coupling of FIG. 27.
Figure 29:
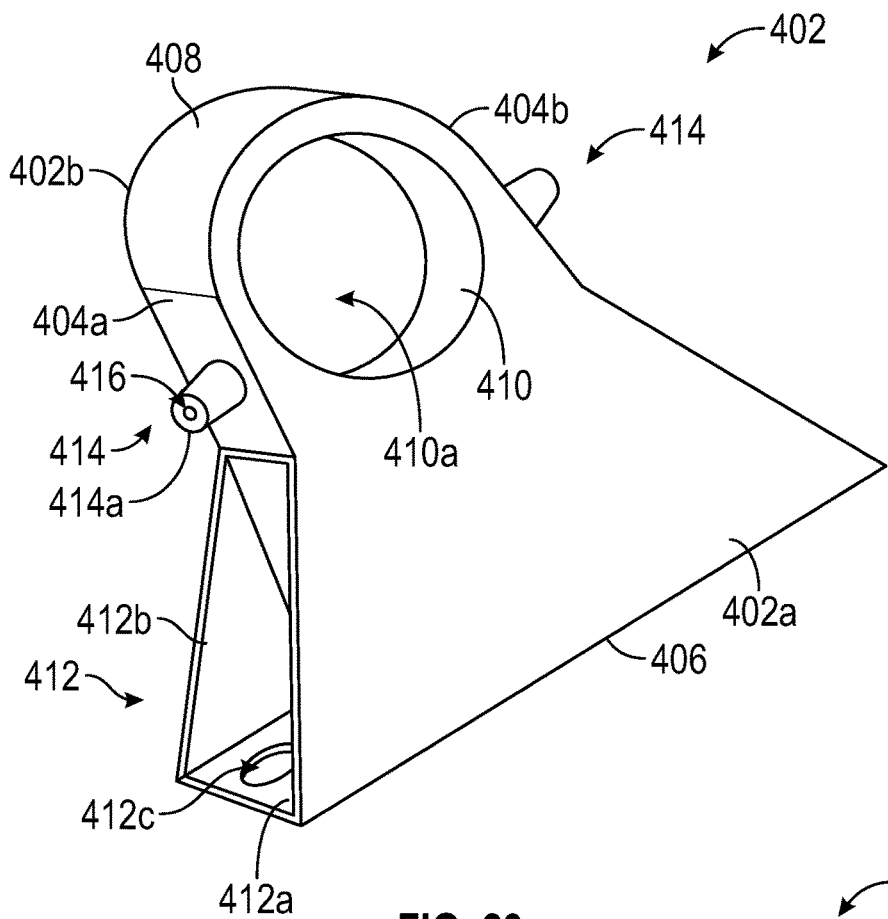
FIG. 29 is a perspective view of a bearing housing assembly of the torque tube coupling of FIG. 27.

Continuing with FIG. 30, the gimbal 430 includes a tongue 444 disposed on a lower portion of the outer surface 432a of the bearing housing 432. The tongue 444 is interposed between the pair of arms 436 and includes a generally arcuate profile defining opposed upper and lower surfaces 444a and 444b, respectively. The arcuate profile of the tongue 444 includes a curvature that causes the upper surface 444a of the tongue to be disposed adjacent the bottom surface 406 of the bearing housing assembly 402 (FIG. 28). In this manner, the tongue 444 may slide relative to the bottom surface 406 of the bearing housing assembly 402 as the gimbal 430 rotates relative to the bearing housing assembly 402. Once a desired angle of the gimbal 430 relative to the bearing housing assembly 402 is achieved, the tongue 444 may be locked or otherwise fixed to the bottom surface 406 of the bearing housing assembly 406 to inhibit further rotation of the gimbal 430 relative to the bearing housing assembly 406. It is envisioned that the tongue 444 may be locked to the bottom surface 406 using any suitable means, such as fasteners, clamps, amongst others. Although generally described as being disposed adjacent the bottom surface 406, it is contemplated that the tongue 444 may be slidably disposed within a slot (not shown) or other suitable feature formed within the bearing housing assembly 402.

Returning to FIGS. 27 and 28, the articulation joint 450 is substantially similar to the articulation joint 350 and therefore will not be described in detail herein in the interest of brevity. The outer shell 460 of the CV joint assembly 452 is rotatably supported within the through-bore 410a of the bearing housing assembly 402 and is axially restrained therein similarly to that of the CV joint assembly 352. In this manner, the outer shell 460 of the CV joint assembly 452 is axially located using the mounting flange 132 of a cradle 130 on one side of the outer shell 460 and a retaining flange 456 disposed on an opposite side of the outer shell 460. The stub axle 470 is rotatably supported within the through-hole 434a of the bearing housing 432 of the gimbal 430 similarly to the stub axle 370 being rotatably supported within the bearing disposed within the cavity 342 of the bearing housing 340 of the swivel flange 330. In this manner, rotation of the stub axle 470 effectuates a corresponding rotation of the CV joint assembly 452 and vice versa.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A coupling system for use with a solar tracker, comprising:
   a pair of cradles, each cradle of the pair of cradles operably coupled to a respective portion of an articulation joint interposed between the pair of cradles, wherein a first cradle of the pair of cradles is rotatable relative to a second cradle of the pair of cradles about a transverse axis, the transverse axis offset from a center portion defined between the pair of cradles in a longitudinal direction,
   wherein each of the pair of cradles is configured to receive a portion of a respective torque tube therein.

2. The coupling system according to claim 1, further comprising a support flange rotatably supporting a first portion of the articulation joint and a swivel flange rotatably supporting a second portion of the articulation joint, the second portion of the articulation joint operably coupled to the first portion of the articulation joint.

3. The coupling system according to claim 2, wherein the swivel flange is rotatably supported on the support flange such that the swivel flange is selectively permitted to rotate relative to the support flange about a first axis.

4. The coupling system according to claim 3, wherein the articulation joint is rotatably supported by the support flange and the swivel flange about a second axis that is generally transverse to the first axis.

5. The coupling system according to claim 2, further comprising at least one locking fastener, the at least one locking fastener selectively coupled to a portion of each of the support flange and the swivel flange, the at least one locking fastener configured to selectively inhibit rotation of the swivel flange relative to the support flange.

6. The coupling system according to claim 5, wherein the at least one locking fastener is configured to permit rotation of the pair of cradles relative to one another when placed in a first, unlocked position and inhibit rotation of the pair of cradles relative to one another when placed in a second, locked position.

7. The coupling system according to claim 5, wherein the at least one locking fastener is operably coupled to a slot having an arcuate profile.

8. The coupling system according to claim 2, further comprising a pair of stow stops disposed on the support flange, the pair of stow stops configured to selectively abut a respective portion of a cradle of the pair of cradles to inhibit over rotation of the pair of cradles in a first direction and in a second direction.

9. A solar tracker, comprising:
at least one pier;
a pair of torque tubes, wherein the at least one pier is interposed between the pair of torque tubes; and
a coupling system, the coupling system including:
a pair of cradles, each cradle of the pair of cradles operably coupled to a respective portion of an articulation joint interposed between the pair of cradles, wherein a first cradle of the pair of cradles is rotatable relative to a second cradle of the pair of cradles about a transverse axis, the transverse axis offset from a center portion defined between the pair of cradles in a longitudinal direction,
wherein each of the pair of cradles is configured to receive a portion of a respective torque tube therein.

10. The solar tracker according to claim 9, wherein the coupling system further comprises a support flange rotatably supporting a first portion of the articulation joint and a swivel flange rotatably supporting a second portion of the articulation joint, the second portion of the articulation joint operably coupled to the first portion of the articulation joint.

11. The solar tracker according to claim 10, wherein the swivel flange is rotatably supported on the support flange such that the swivel flange is selectively permitted to rotate relative to the support flange about a first axis.

12. The solar tracker according to claim 11, wherein the articulation joint is rotatably supported by the support flange and the swivel flange about a second axis that is generally transverse to the first axis.

13. The solar tracker according to claim 10, further comprising at least one locking fastener, the at least one locking fastener selectively coupled to a portion of each of the support flange and the swivel flange, the at least one locking fastener configured to selectively inhibit rotation of the swivel flange relative to the support flange.

14. The solar tracker according to claim 13, wherein the at least one locking fastener is configured to permit rotation of the pair of cradles relative to one another when placed in a first, unlocked position and inhibit rotation of the pair of cradles relative to one another when placed in a second, locked position.

15. The solar tracker according to claim 13, wherein the at least one locking fastener is operably coupled to a slot having an arcuate profile.

16. The solar tracker according to claim 10, further comprising a pair of stow stops disposed on the support flange, the pair of stow stops configured to selectively abut a respective portion of a cradle of the pair of cradles to inhibit over rotation of the pair of cradles in a first direction and in a second direction.

17. A coupling system for use with a solar tracker, comprising:
a support flange;
a swivel flange rotatably supported on the support flange at a location that is offset from a center portion of the support flange;
an articulation joint, the articulation joint interposed between each of the support flange and the swivel flange and rotatably supported by each of the support flange and the swivel flange, wherein opposed first and second end portions of the articulation joint are configured to be operably coupled to a respective first and second torque tube.

18. The coupling system according to claim 17, wherein the swivel flange is rotatably supported on the support flange such that the swivel flange is selectively permitted to rotate relative to the support flange about a first axis.

19. The solar tracker according to claim 18, wherein the articulation joint is rotatably supported by the support flange and the swivel flange about a second axis that is generally transverse to the first axis.

20. The solar tracker according to claim 17, further comprising a pair of stow stops disposed on the support flange, the pair of stow stops configured to selectively abut a respective portion of a cradle of the pair of cradles to inhibit over rotation of the pair of cradles in a first direction and in a second direction.

* * * * *